(12) United States Patent
Morita

(10) Patent No.: US 11,595,537 B2
(45) Date of Patent: Feb. 28, 2023

(54) INSPECTION APPARATUS, CONTROL METHOD THEREFOR, PRINT SYSTEM, AND STORAGE MEDIUM WITH PERFORMING, BASED ON NUMBER OF FEATURE POINTS, ALIGNMENT OF READ IMAGE WITH REFERENCE IMAGE

(71) Applicant: CANON KABUSHIKI KAISHA, Tokyo (JP)

(72) Inventor: Seijiro Morita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 17/171,153

(22) Filed: Feb. 9, 2021

(65) Prior Publication Data

US 2021/0274050 A1    Sep. 2, 2021

(30) Foreign Application Priority Data

Feb. 27, 2020    (JP) .............................. JP2020-032194

(51) Int. Cl.
*H04N 1/00* (2006.01)

(52) U.S. Cl.
CPC ....... *H04N 1/0066* (2013.01); *H04N 1/00721* (2013.01); *H04N 1/00737* (2013.01); *H04N 1/00748* (2013.01)

(58) Field of Classification Search
None
See application file for complete search history.

(56) References Cited

U.S. PATENT DOCUMENTS

| | | | |
|---|---|---|---|
| 7,859,720 B2 | 12/2010 | Yokoyama et al. | |
| 8,780,378 B2 | 7/2014 | Yamamoto | |
| 2013/0114102 A1* | 5/2013 | Yamamoto | H04N 1/193 358/1.14 |

FOREIGN PATENT DOCUMENTS

JP    2013-101015 A    5/2013

* cited by examiner

*Primary Examiner* — Andrew H Lam
(74) *Attorney, Agent, or Firm* — Venable LLP

(57) ABSTRACT

A verification apparatus includes a reading unit configured to read an image of a conveyed sheet. The apparatus obtains a reference image for verification of a sheet, and extracts, from the reference image, feature points to be used for alignment of an image with the reference image. The apparatus aligns, with the reference image, a read image obtained by reading an image of a verification target sheet by the reading unit, and verifies the read image by comparing the aligned read image with the reference image. Based on a number of the feature points extracted from the reference image the alignment is performed using positions of the feature points or using positions of sheet vertices each indicating a corner of the sheet.

15 Claims, 15 Drawing Sheets

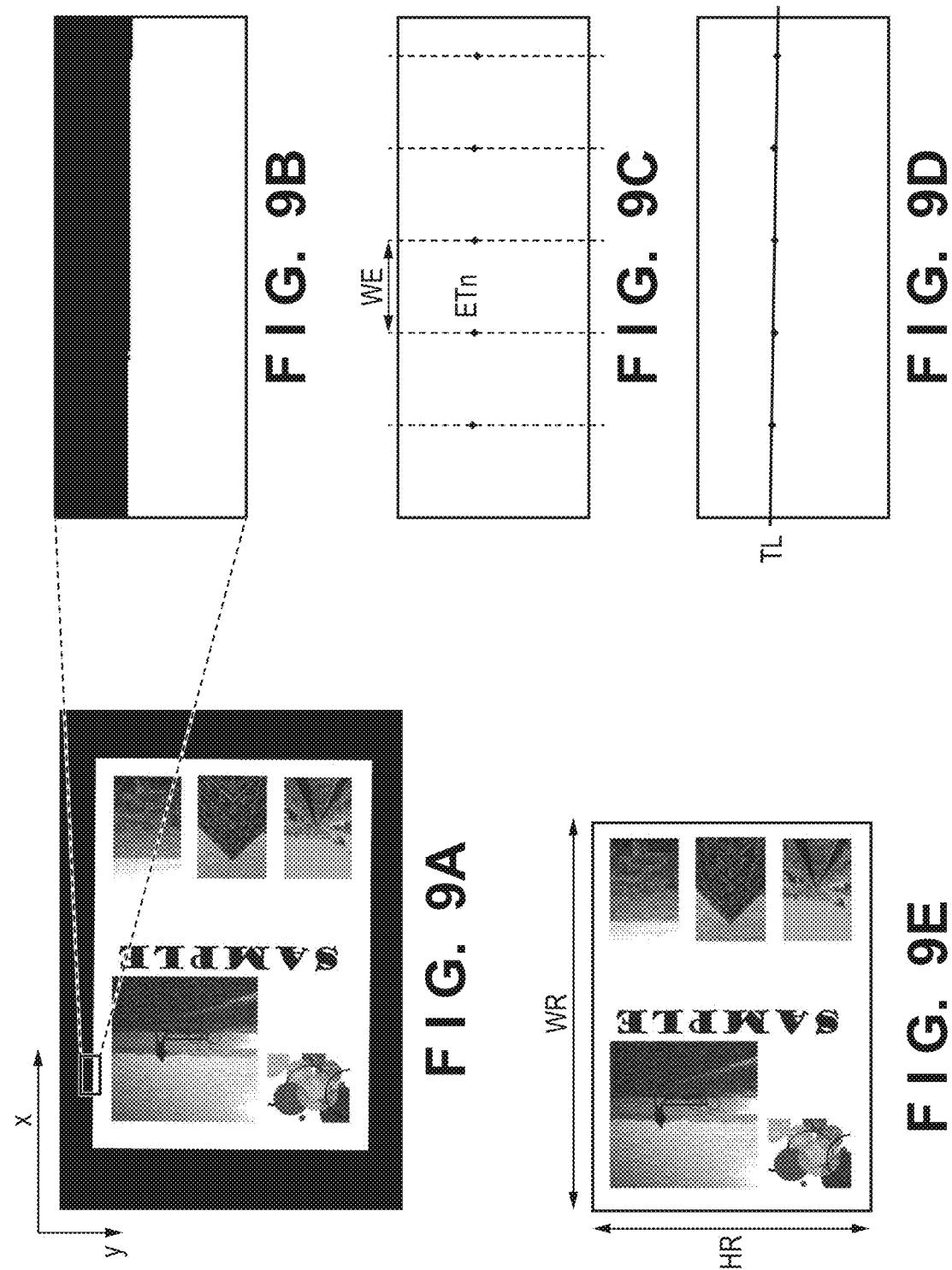

FIG. 10A
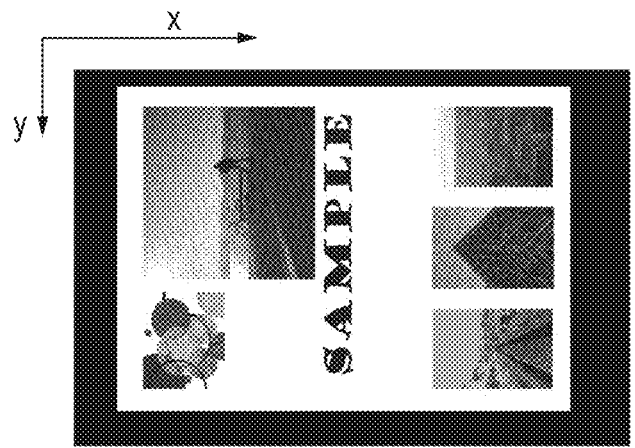
FIG. 10B
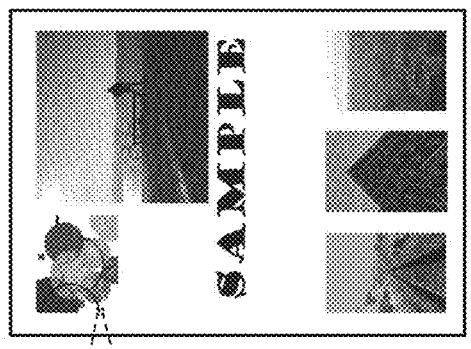
FIG. 10C
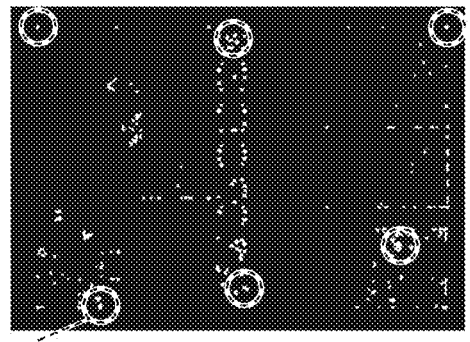
FIG. 10D

INSPECTION APPARATUS, CONTROL METHOD THEREFOR, PRINT SYSTEM, AND STORAGE MEDIUM WITH PERFORMING, BASED ON NUMBER OF FEATURE POINTS, ALIGNMENT OF READ IMAGE WITH REFERENCE IMAGE

BACKGROUND OF THE INVENTION

Field of the Invention

The present invention relates to a verification apparatus for inspecting a sheet on which an image has been printed, a method for controlling the verification apparatus, a print system, and a storage medium.

Description of the Related Art

There is known a print system that allows a verification apparatus to inspect, during conveyance, a print sheet on which an image has been printed by a print apparatus. The verification apparatus reads the image on the conveyed print sheet, and determines whether the print sheet is normal by performing image analysis of the image obtained by the reading operation. This inspection processing makes it possible to detect a print sheet including an abnormality such as omission of a barcode or ruled line, image omission, a print failure, page missing, or color misregistration.

Japanese Patent Laid-Open No. 2013-101015 describes a verification apparatus that performs alignment between images based on feature points extracted from the images when comparing a print image obtained by reading a conveyed print sheet with a reference image for inspection. If no sufficient number of feature points are extracted to perform alignment between the images, the verification apparatus performs inspection based on the number of feature points extracted from the print image without performing alignment between the images.

In the above-described conventional technique, if no sufficient number of feature points can be extracted from the reference image, for example, if the reference image is an image corresponding to a blank sheet, alignment between the images is not performed. If alignment between the images is not performed, it is impossible to compare the print image with the reference image, and it is thus impossible to determine a specific abnormality occurring at a specific position on the print sheet.

SUMMARY OF THE INVENTION

The present invention has been made in consideration of the above problem, and provides a technique of performing, even when inspecting a print sheet on which an image including a small number of feature points has been printed, alignment between a reference image for inspection and a read image of the print sheet.

According to one aspect of the present invention, there is provided a verification apparatus comprising: an obtaining unit configured to obtain a reference image for verification of a sheet; an extraction unit configured to extract, from the reference image, feature points to be used for alignment of an image with the reference image; a reading unit configured to read an image of a conveyed sheet; an alignment unit configured to align, with the reference image, a read image obtained by reading an image of a verification target sheet by the reading unit; and a verification unit configured to verify the read image by comparing the aligned read image with the reference image, wherein the alignment unit performs, based on a number of the feature points extracted by the extraction unit from the reference image, the alignment using positions of the feature points or using positions of sheet vertices each indicating a corner of the sheet.

According to another aspect of the present invention, there is provided a print system comprising: a print apparatus configured to print an image on a sheet; and a verification apparatus configured to verify a sheet on which an image has been printed by the print apparatus and which has been conveyed through a conveyance path, wherein the verification apparatus comprises: an obtaining unit configured to obtain a reference image for verification of a sheet; an extraction unit configured to extract, from the reference image, feature points to be used for alignment of an image with the reference image; a reading unit configured to read an image of a sheet conveyed thorough the conveyance path; an alignment unit configured to align, with the reference image, a read image obtained by reading an image of a verification target sheet by the reading unit; and a verification unit configured to verify the read image by comparing the aligned read image with the reference image, and wherein the alignment unit performs, based on a number of the feature points extracted by the extraction unit from the reference image, the alignment using positions of the feature points or using positions of sheet vertices each indicating a corner of the sheet.

According to still another aspect of the present invention, there is provided a method for controlling a verification apparatus that includes a reading unit configured to read an image of a conveyed sheet, the method comprising: obtaining a reference image for verification of a sheet; extracting, from the reference image, feature points to be used for alignment of an image with the reference image; aligning, with the reference image, a read image obtained by reading an image of a verification target sheet by the reading unit; and verifying the read image by comparing the aligned read image with the reference image, wherein in the aligning, based on a number of the feature points extracted from the reference image, the alignment is performed using positions of the feature points or using positions of sheet vertices each indicating a corner of the sheet.

According to yet another aspect of the present invention, there is provided a non-transitory computer-readable storage medium storing a computer program for causing a computer to execute a method for controlling a verification apparatus that includes a reading unit configured to read an image of a conveyed sheet, the method comprising: obtaining a reference image for verification of a sheet; extracting, from the reference image, feature points to be used for alignment of an image with the reference image; aligning, with the reference image, a read image obtained by reading an image of a verification target sheet by the reading unit; and verifying the read image by comparing the aligned read image with the reference image, wherein in the aligning, based on a number of the feature points extracted from the reference image, the alignment is performed using positions of the feature points or using positions of sheet vertices each indicating a corner of the sheet.

Further features of the present invention will become apparent from the following description of exemplary embodiments (with reference to the attached drawings).

BRIEF DESCRIPTION OF THE DRAWINGS

FIGS. 9A to 9E are views showing an example of processing of extracting the sheet vertices.

FIGS. 10A to 10D are views showing an example of extraction of feature points from the reference image.

DESCRIPTION OF THE EMBODIMENTS

Figure 1:
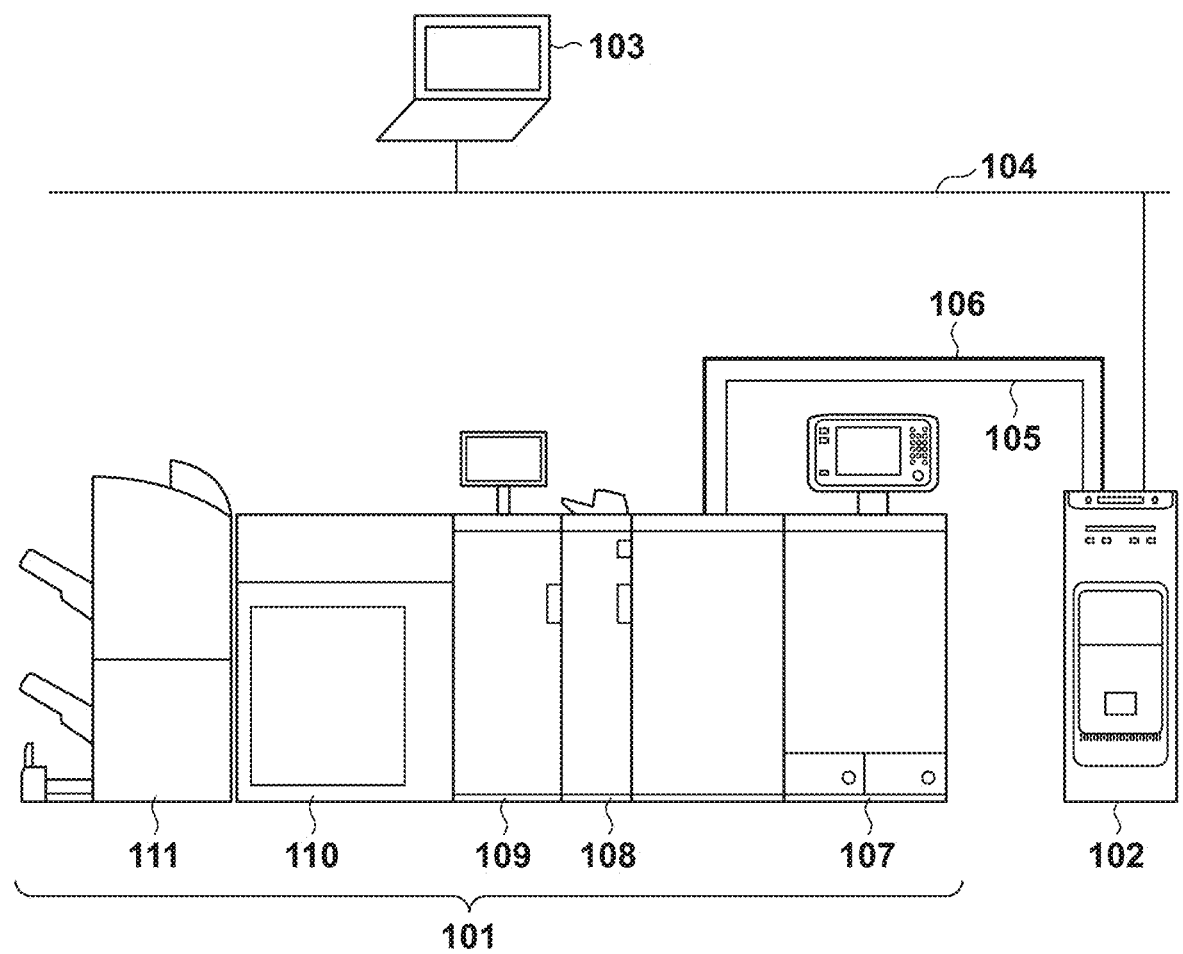
FIG. 1 is a view showing an example of a network configuration including a print system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view showing an example of a network configuration including a print system according to the first embodiment. As shown in FIG. 1, a print system 101 is connected to an external controller 102. The print system 101 and the external controller 102 form an image processing system. The print system 101 may be referred to as, for example, an image forming apparatus or a multifunction peripheral (MFP). The print system 101 and the external controller 102 are communicably connected via an internal LAN 105 and a video cable 106. The external controller 102 is communicably connected to a client PC 103 via an external LAN 104. The external controller 102 may be referred to as, for example, an image processing controller, a digital front end (DFE), or a print server.

The client PC 103 can issue a print instruction to the external controller 102 via the external LAN 104. A printer driver is installed on the client PC 103. The printer driver has a function of converting print data into data in a print description language processable by the external controller 102. The user can issue, by operating the client PC 103, a print instruction to the print system 101 via the printer driver from various applications installed on the PC. The printer driver transmits print data to the external controller 102 based on the print instruction from the user. Upon receiving the print data from the client PC 103, the external controller 102 performs data analysis and rasterization processing for the received print data, and inputs the processed print data to the print system 101, thereby issuing a print instruction.

The print system 101 includes a plurality of apparatuses having different functions, and is configured to execute various kinds of processes such as bookbinding processing. In the present embodiment, the print system 101 is formed by a print apparatus 107, an inserter 108, a verification apparatus 109, a large-volume stacker 110, and a finisher 111. A sheet (paper sheet) on which an image is printed by the print apparatus 107 and which is discharged from the print apparatus 107 is conveyed in the respective apparatuses of the inserter 108, the verification apparatus 109, the large-volume stacker 110, and the finisher 111 in this order. In the present embodiment, the print system 101 is an example of an image forming apparatus, but the print apparatus 107 included in the print system 101 may be referred to as an image forming apparatus.

The print apparatus 107 forms (prints), using toner (developing material), an image on a sheet fed and conveyed from a paper feed unit arranged in the lower portion of the print apparatus 107. The inserter 108 is an apparatus that inserts an insertion sheet to a series of sheets conveyed from the print apparatus 107. The verification apparatus 109 is an apparatus that inspects the sheet on which the image has been printed by the print apparatus 107 and which has been conveyed through a conveyance path. More specifically, the verification apparatus 109 inspects the image printed on the sheet (determines whether the image is normal or not) by reading the image printed on the conveyed sheet, and comparing the obtained read image with a preregistered reference image. The large-volume stacker 110 is an apparatus on which a number of sheets can be stacked. The finisher 111 is an apparatus that can execute finishing processing such as stapling processing, punching processing, and saddle stitch processing for the conveyed sheets. The sheets processed by the finisher 111 are discharged to a predetermined discharge tray.

In the configuration example shown in FIG. 1, the external controller 102 is connected to the print system 101. However, the present embodiment is applicable to a different configuration. For example, a configuration in which the print system 101 is connected to the external LAN 104, and print data is transmitted from the client PC 103 to the print system 101 without intervention of the external controller 102 may be used. In this case, the print system 101 executes data analysis and rasterization for the print data.

<Print System>

Figure 2:
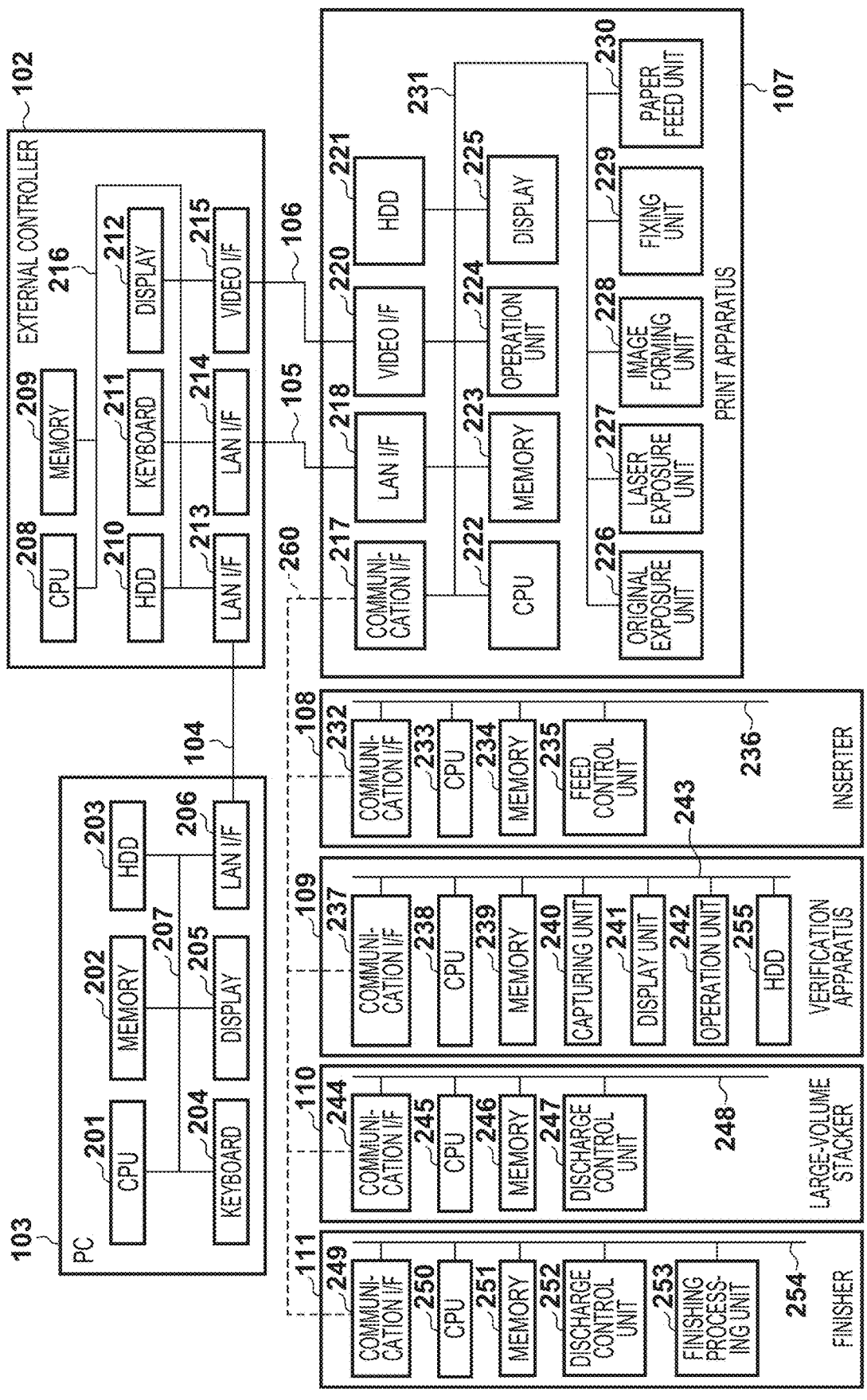
FIG. 2 is a block diagram showing an example of the hardware arrangement of the print system.

FIG. 2 is a block diagram showing an example of the hardware arrangement of the print system 101, the external controller 102, and the client PC 103. An example of the arrangement of the print system 101 will be described with reference to FIG. 2.

The print apparatus 107 of the print system 101 includes a communication I/F (interface) 217, a LAN I/F 218, a video I/F 220, an HDD 221, a CPU 222, a memory 223, an operation unit 224, and a display 225. The print apparatus 107 further includes an original exposure unit 226, a laser exposure unit 227, an image forming unit 228, a fixing unit 229, and a paper feed unit 230. These devices are interconnected via a system bus 231.

The communication I/F 217 is connected to the inserter 108, the verification apparatus 109, the large-volume stacker 110, and the finisher 111 via a communication cable 260. The CPU 222 performs communication for controlling each apparatus via the communication I/F 217. The LAN I/F 218 is connected to the external controller 102 via the internal LAN 105, and is used to communicate control data and the like. The video I/F 220 is connected to the external controller 102 via the video cable 106, and is used to communicate data such as image data. Note that if the external controller 102 can control the operation of the print system 101, the print apparatus 107 (print system 101) and the external controller 102 may be connected by only the video cable 106.

The HDD 221 saves various programs or data. The CPU 222 controls the operation of the overall print apparatus 107 by executing the programs saved in the HDD 221. The memory 223 stores programs and data necessary for the CPU 222 to perform various kinds of processes. The memory 223 operates as the work area of the CPU 222. The operation unit 224 accepts input of various settings and operation instructions from the user. The display 225 is used to display various kinds of information such as setting information and the processing status of a print job.

The original exposure unit 226 reads an original when a copy function or a scan function is used. The original exposure unit 226 reads an original by illuminating, with an exposure lump, a sheet set by the user and capturing an image by a CMOS image sensor. In print processing (image forming processing), the laser exposure unit 227 forms an electrostatic latent image on a photosensitive drum by charging the photosensitive drum and exposing the photosensitive drum using a laser beam modulated in accordance with image data. The image forming unit 228 includes a developing unit that forms a toner image by developing the electrostatic latent image formed on the photosensitive drum, a primary transfer unit that transfers the toner image from the photosensitive drum to an intermediate transfer belt, and a secondary transfer unit that transfers the toner image from the intermediate transfer belt to a sheet. The fixing unit 229 fixes the toner image to the sheet by applying heat and a pressure to the toner image transferred to the sheet. The paper feed unit 230 feeds, from a paper feed deck (paper feed cassette) to a conveyance path, a sheet that is to undergo image forming of the image forming unit 228. A feeding operation and a conveyance operation of the sheet are controlled using various rollers or sensors.

The inserter 108 includes a communication I/F 232, a CPU 233, a memory 234, and a feed control unit 235. These devices are interconnected via a system bus 236. The communication I/F 232 is connected to the print apparatus 107 via the communication cable 260. The CPU 233 performs, via the communication I/F 232, communication necessary to control the inserter 108. The CPU 233 controls the operation of the inserter 108 by executing a control program stored in the memory 234. The memory 234 saves the control program for the inserter 108. The feed control unit 235 controls various rollers and sensors in accordance with an instruction from the CPU 233, thereby controlling feed of an insertion sheet from the paper feed unit of the inserter 108, and conveyance of the sheet conveyed from the print apparatus 107.

The verification apparatus 109 includes a communication I/F 237, a CPU 238, a memory 239, a capturing unit 240, a display unit 241, an operation unit 242, and an HDD 255. These devices are interconnected via a system bus 243. The communication I/F 237 is connected to the print apparatus 107 via the communication cable 260. The CPU 238 performs, via the communication I/F 237, communication necessary to control the verification apparatus 109. The CPU 238 controls the operation of the verification apparatus 109 by executing a control program stored in the memory 239. The memory 239 saves the control program for the verification apparatus 109.

The capturing unit 240 captures the conveyed sheet in accordance with an instruction of the CPU 238. The CPU 238 performs processing of saving the image captured by the capturing unit 240, in the memory 239 as a reference image. The CPU 238 further performs verification processing of comparing the image captured by the capturing unit 240 with the reference image saved in the memory 239, and, based on a result of the comparison, inspecting (verifying) the image printed on the sheet. The display unit 241 is used to display a verification result, a setting screen, and the like. The operation unit 242 is operated by the user and accepts various instructions (for example, a setting change instruction of the verification apparatus 109, a registration instruction of the reference image, and the like) from the user. The HDD 255 saves image data and various kinds of setting information necessary for verification in verification processing. The image data and the various kinds of setting information saved in the HDD 255 are reusable.

The large-volume stacker 110 includes a communication I/F 244, a CPU 245, a memory 246, and a discharge control unit 247. These devices are interconnected via a system bus 248. The communication I/F 244 is connected to the print apparatus 107 via the communication cable 260. The CPU 245 performs, via the communication I/F 244, communication necessary to control the large-volume stacker 110. The CPU 245 controls the operation of the large-volume stacker 110 by executing a control program stored in the memory 246. The memory 246 saves the control program for the large-volume stacker 110. In accordance with an instruction from the CPU 245, the discharge control unit 247 executes control of discharging the sheet conveyed through the conveyance path to a stack tray or an escape tray, or conveying the sheet to the finisher 111 connected on the downstream side of the sheet in a conveyance direction.

The finisher 111 includes a communication I/F 249, a CPU 250, a memory 251, a discharge control unit 252, and a finishing processing unit 253. These devices are interconnected via a system bus 254. The communication I/F 249 is connected to the print apparatus 107 via the communication cable 260. The CPU 250 performs, via the communication I/F 249, communication necessary to control the finisher 111. The CPU 250 controls the operation of the finisher 111 by executing a control program stored in the memory 251. The memory 251 saves the control program for the finisher 111. The discharge control unit 252 controls conveyance and discharge of the sheet in accordance with an instruction from the CPU 250. The finishing processing unit 253 performs finishing processing such as stapling, punching, or saddle stitch processing in accordance with an instruction from the CPU 250.

<External Controller>

The external controller 102 includes a CPU 208, a memory 209, an HDD 210, a keyboard 211, a display 212, LAN I/Fs 213 and 214, and a video I/F 215. These devices are interconnected via a system bus 216. The CPU 208 controls the operation (for example, reception of print data from the client PC 103, RIP processing, and transmission of print data to the print system 101) of the overall external controller 102 by executing a program saved in the HDD 210. The memory 209 saves programs and data necessary for the CPU 208 to perform various kinds of processes. The memory 209 operates as the work area of the CPU 208.

The HDD 210 saves various programs and data. The keyboard 211 is used to input an operation instruction of the external controller 102 from the user. The display 212 is used to display, for example, an operation screen and information of an application during execution in the external controller 102. The LAN I/F 213 is connected to the client PC 103 via the external LAN 104, and is used to communicate data such as a print instruction. The LAN I/F 214 is connected to the print system 101 via the internal LAN 105, and is used to communicate data such as a print instruction. The external controller 102 is configured to communicate with the print apparatus 107, the inserter 108, the verification apparatus 109, the large-volume stacker 110, and the finisher 111 via the internal LAN 105 and the communication cable 260. The video I/F 215 is connected to the print system 101 via the video cable 106, and is used to communicate data such as image data (print data).

<Client PC>

The client PC 103 includes a CPU 201, a memory 202, an HDD 203, a keyboard 204, a display 205, and a LAN I/F 206. These devices are interconnected via a system bus 207. The CPU 201 controls the operation of each device via the system bus 207 by executing a program saved in the HDD 203. This implements various kinds of processes by the client PC 103. For example, the CPU 201 issues a print data generation and print instruction by executing a document processing program saved in the HDD 203. The memory 202 stores programs and data necessary for the CPU 201 to perform various kinds of processes. The memory 202 operates as the work area of the CPU 201.

The HDD 203 saves various data and programs such as a printer driver and various applications (for example, the document processing program). The keyboard 204 is used to input an operation instruction of the client PC 103 from the user. The display 205 is used to display, for example, an operation screen and information of an application during execution in the client PC 103. The LAN I/F 206 is communicably connected to the external controller 102 via the external LAN 104. The CPU 201 communicates with the external controller 102 via the LAN I/F 206.

<Example of Operation of Print System>

Figure 3:
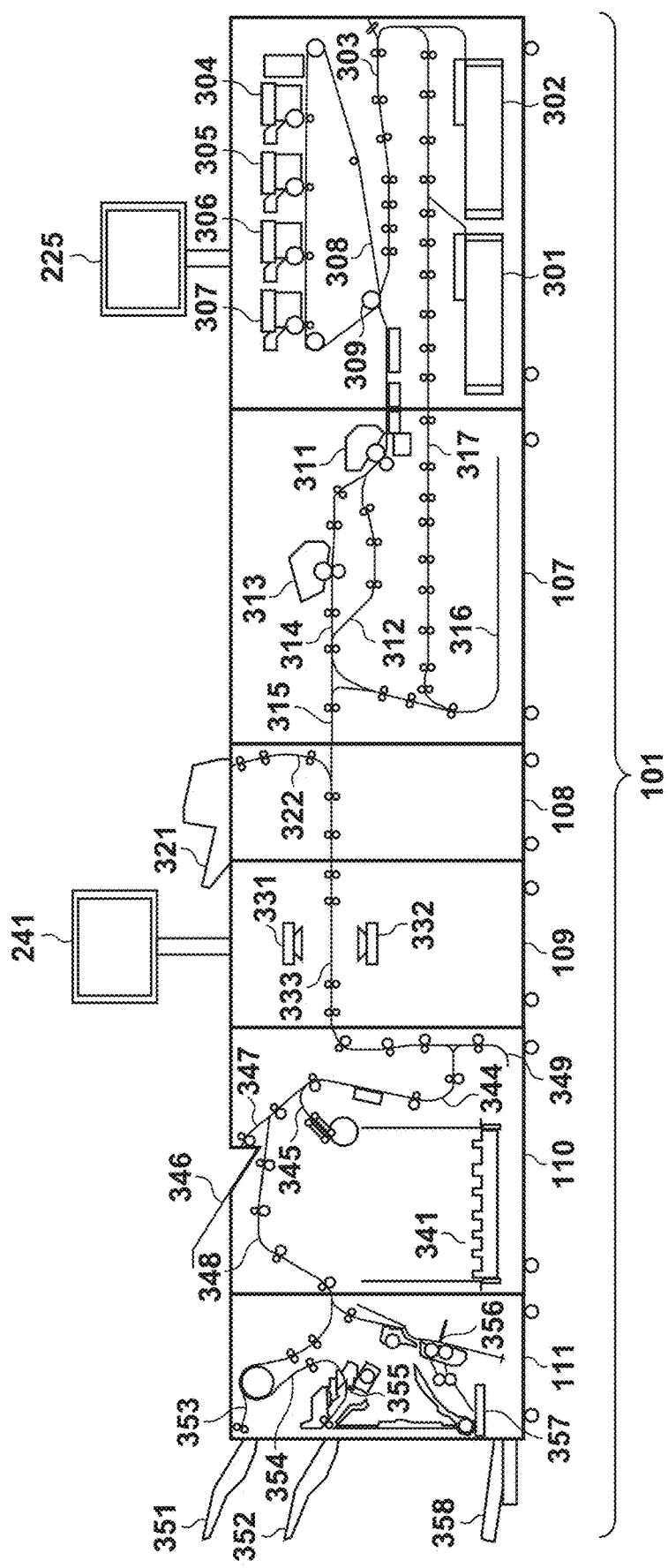
FIG. 3 is a sectional view showing an example of the hardware arrangement of the print system.

FIG. 3 is a sectional view showing an example of the hardware arrangement of the print system 101. A practical example of the operation of the print system 101 will be described below with reference to FIG. 3.

In the print apparatus 107, various kinds of sheets are stored in paper feed decks 301 and 302. Among sheets stored in each print deck, a sheet at the uppermost position is separated and fed to a conveyance path 303 one by one. Each of image forming stations 304 to 307 includes a photosensitive drum (photosensitive member), and forms a toner image on the photosensitive drum using toner of a different color. More specifically, the image forming stations 304 to 307 form toner images using toners of yellow (Y), magenta (M), cyan (C), and black (K), respectively.

The toner images of the respective colors formed in the image forming stations 304 to 307 are sequentially transferred (primary transfer) on an intermediate transfer belt 308 with being overlaid with each other. The toner images transferred to the intermediate transfer belt 308 are conveyed up to a secondary transfer position 309 in accordance with the rotation of the intermediate transfer belt 308. At the secondary transfer position 309, the toner images are transferred (secondary transfer) from the intermediate transfer belt 308 to the sheet conveyed through the conveyance path 303. The sheet after the secondary transfer is conveyed to a fixing unit 311. The fixing unit 311 includes a pressure roller and a heating roller. Fixing processing of fixing the toner images to the sheet is performed by applying heat and a pressure to the sheet while the sheet passes between these rollers. The sheet having passed through the fixing unit 311 passes through a conveyance path 312 and is conveyed to a connecting point 315 between the print apparatus 107 and the inserter 108. In this way, a color image is formed (printed) on the sheet.

If further fixing processing is required in accordance with the type of sheet, the sheet having passed through the fixing unit 311 is guided to a conveyance path 314 in which a fixing unit 313 is provided. The fixing unit 313 performs further fixing processing for the sheet conveyed through the conveyance path 314. The sheet having passed through the fixing unit 313 is conveyed to the connecting point 315. If an operation mode of performing double-sided printing is set, the sheet including the first surface with an image printed and conveyed through the conveyance path 312 or 314 is guided to an inverting path 316. The sheet inverted in the inverting path 316 is guided to a double-sided conveyance path 317, and conveyed up to the secondary transfer position 309. Thus, the toner images are transferred to the second surface on the opposite side of the first surface of the sheet at the secondary transfer position 309. After that, the sheet passes through the fixing unit 311 (and the fixing unit 313), thereby completing the formation of the color image on the second surface of the sheet.

The sheet on which the formation (printing) of the image by the print apparatus 107 is complete and which has been conveyed to the connecting point 315 is conveyed into the inserter 108. The inserter 108 includes an inserter tray 321 on which an insertion sheet is set. The inserter 108 performs processing of inserting the insertion sheet fed from the inserter tray 321 to an arbitrary insertion position in the series of sheets conveyed from the print apparatus 107, and conveying the sheets to an apparatus (verification apparatus 109) of the succeeding stage. The sheets having passed through the inserter 108 are sequentially conveyed to the verification apparatus 109.

The verification apparatus 109 includes CISs (Contact Image Sensors) 331 and 332 forming the capturing unit 240 on a conveyance path 333 through which the sheet is conveyed from the inserter 108. The CISs 331 and 332 are arranged at opposite positions via the conveyance path 333. The CISs 331 and 332 are configured to read the upper surface (first surface) and the lower surface (second surface) of the sheet, respectively. Note that the capturing unit 240 may be formed by, for example, line scan cameras instead of the CISs.

The verification apparatus 109 performs verification processing of inspecting the image printed on the sheet conveyed through the conveyance path 333. More specifically, the verification apparatus 109 performs reading processing of reading the image on the sheet using the capturing unit 240 (CISs 331 and 332) at a timing when the sheet being conveyed reaches a predetermined position. Furthermore, based on the image obtained by the reading processing, the verification apparatus 109 inspects the image printed on the sheet. The sheet having passed through the verification apparatus 109 is conveyed to the large-volume stacker 110.

In the present embodiment, the verification apparatus 109 performs verification processing by comparing the read image obtained by reading the image printed on the sheet with the preregistered reference image. Note that the verification apparatus 109 may perform verification processing by comparing, with the preregistered reference image, the read image obtained by reading only the image printed on the front surface using only the CIS 331. Alternatively, the verification apparatus 109 may perform verification processing by comparing, with the preregistered reference image, the read image of the front surface obtained by reading the image printed on the front surface of the sheet, and also perform verification processing by comparing the read image of the back surface with the preregistered reference image, using the CISs 331 and 323. Examples of a method of comparing images in verification processing are a method of comparing pixel values of respective pixels, a method of comparing the positions of objects obtained by edge detection, and a method using extraction of character data by OCR (Optical Character Recognition). Furthermore, the verification apparatus 109 performs verification processing for preset inspection items. Examples of the inspection items are a shift of the print position of the image, the tone of the image, the density of the image, streaks or thin spots in the image, and omission of printing.

The large-volume stacker 110 includes a stack tray 341 as a tray on which a sheet conveyed from the apparatus (verification apparatus 109) on the upstream side in the conveyance direction of the sheet is stacked. The sheet having passed through the verification apparatus 109 is conveyed through a conveyance path 344 in the large-volume stacker 110. The sheet conveyed through the conveyance path 344 is guided to a conveyance path 345, and then stacked on the stack tray 341.

The large-volume stacker 110 further includes an escape tray 346 as a discharge tray. In the present embodiment, the escape tray 346 is used to discharge a sheet which has been determined, as a result of verification by the verification apparatus 109, that the printed image is abnormal. The sheet conveyed through the conveyance path 344 is conveyed to the escape tray 346 by being guided to a conveyance path 347. The sheet conveyed without being stacked on or discharged to the large-volume stacker 110 is conveyed to the finisher 111 of the succeeding stage through a conveyance path 348.

The large-volume stacker 110 also includes an inverting unit 349 for inverting the direction of the conveyed sheet. The inverting unit 349 is used to, for example, make the direction of the sheet input to the large-volume stacker 110 match the direction of the sheet when it is stacked on the stack tray 341 and output from the large-volume stacker 110. Note that the inverting unit 349 does not perform the inversion processing for the sheet conveyed to the finisher 111 without being stacked on the large-volume stacker 110.

The finisher 111 executes, for the sheets conveyed from the apparatus (verification apparatus 109) on the upstream side in the conveyance direction of the sheets, a finishing function designated by the user. In the present embodiment, the finisher 111 has, for example, finishing functions such as a stapling function (1- or 2-point stapling), a punching function (two or three holes), and a saddle stitch function.

The finisher 111 includes two discharge trays 351 and 352. If the finisher 111 performs no finishing processing, the sheets conveyed to the finisher 111 are discharged to the discharge tray 351 through a conveyance path 353. If the finisher 111 performs the finishing processing such as stapling processing, the sheets conveyed to the finisher 111 are guided to a conveyance path 354. The finisher 111 executes, for the sheets conveyed through the conveyance path 354, the finishing processing designated by the user using a processing unit 355, and discharges the sheets to the discharge tray 352. Note that each of the discharge trays 351 and 352 is configured to be movable vertically. The finisher 111 can also operate to stack the sheets having undergone the finishing processing by the processing unit 355, on the discharge tray 351 by moving the discharge tray 351 downward.

If the user designates the saddle stitch processing, the finisher 111 performs stapling processing at the center of the sheets using a saddle stitch processing unit 356, and then two-folds the sheets, thereby generating a bookbinding product. The finisher 111 discharges the generated bookbinding product to a bookbinding tray 358 through a conveyance path 357. The bookbinding tray 358 includes a belt conveyer arrangement for conveying the bookbinding product stacked on the bookbinding tray 358 outside the apparatus.

The registration processing of a reference image and the verification processing of a sheet (print sheet) on which an image has been printed, which are executed by the verification apparatus 109, will be described in more detail below with reference to FIGS. 4 to 12.

<Registration Processing of Reference Image>

Figure 4:
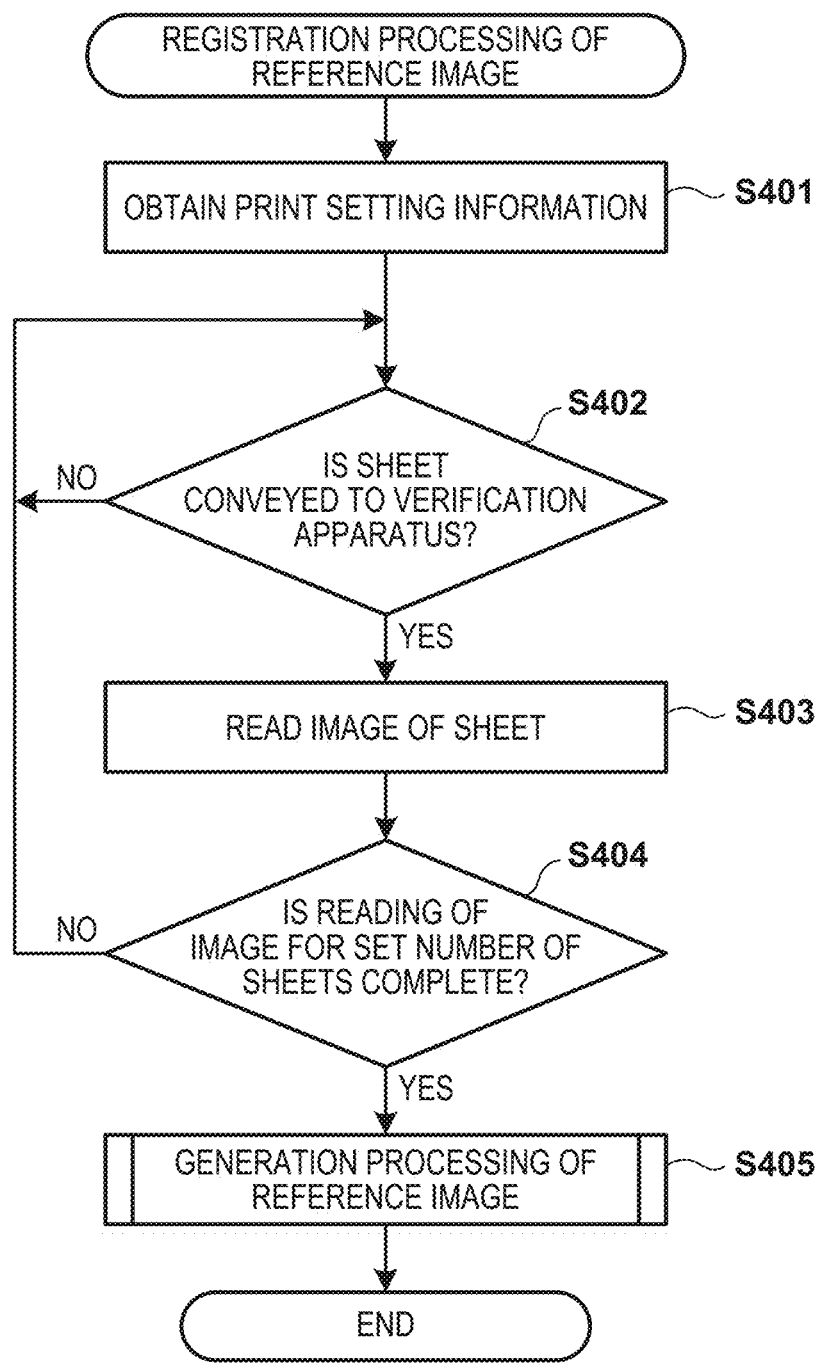
FIG. 4 is a flowchart illustrating the procedure of registration processing of a reference image.

The verification apparatus 109 according to the present embodiment has a function of reading, by the capturing unit 240, a sheet on which an image has been printed, and preregistering, using the obtained read image, a reference image for inspection in verification processing. FIG. 4 is a flowchart illustrating the procedure of registration processing of a reference image, which is executed by the verification apparatus 109. Processing in each step shown in FIG. 4 is executed by the CPU 238 of the verification apparatus 109. The registration processing of the reference image corresponds to processing of generating a reference image based on an image obtained by reading, by the capturing unit 240, the image of a conveyed sheet.

In step S401, the CPU 238 obtains print setting information indicating print settings to be used to print, on a sheet, an image to be used to register a reference image. More specifically, the CPU 238 can obtain such print setting information from the print apparatus 107 by communicating with the print apparatus 107 via the communication cable 260. The print setting information obtained in step S401 can include, for example, information indicating settings concerning the number of sheets per copy, a sheet size, and a sheet surface to be verified.

In step S402, the CPU 238 stands by until a sheet is conveyed from an apparatus (print apparatus 107 and inserter 108) on the upstream side in the conveyance direction of the sheet to the verification apparatus 109. If conveyance of the sheet is detected, the CPU 238 advances the process to step S403. In step S403, the CPU 238 obtains a read image by reading the image of the sheet by the capturing unit 240, and saves the obtained read image in the memory 239.

In step S404, the CPU 238 determines whether or not reading of the image is complete for the set number of sheets indicated by the print setting information obtained in step S401. If reading of the image is incomplete for the set number of sheets, the CPU 238 returns the process to step S402, and continues reading the image of the sequentially conveyed sheet. On the other hand, if reading of the image is complete for the set number of sheets, the CPU 238 advances the process to step S405.

Figure 5:
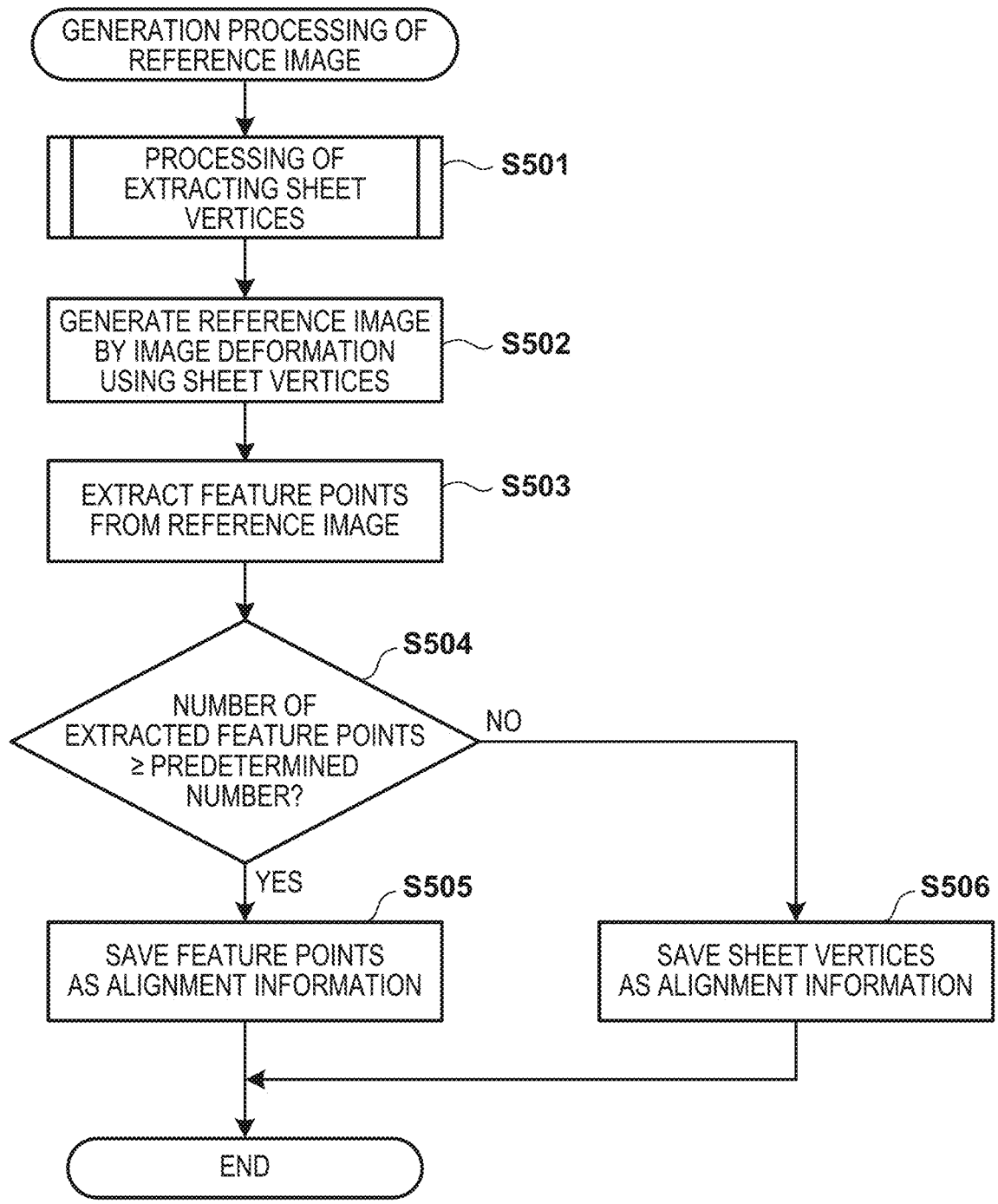
FIG. 5 is a flowchart illustrating the procedure of generation processing (S405) of the reference image.

In step S405, the CPU 238 performs generation processing of generating a reference image using the read image obtained by the above-described processing in accordance with a procedure shown in FIG. 5. In this generation processing, the reference image is registered by saving the generated reference image, the print setting information, and setting information (to be described later) associated with the reference image in the memory 239. Upon completion of the generation processing of the reference image, the CPU 238 ends the processing according to this procedure.

<Generation Processing (S405) of Reference Image>

The processing executed by the verification apparatus 109 when generating a reference image will be described next with reference to FIGS. 5 and 8 to 10D.

FIG. 5 is a flowchart illustrating the procedure of the generation processing of the reference image, which is executed by the CPU 238 of the verification apparatus 109 in step S405. Note that this flowchart describes processing performed for a read image corresponding to one sheet. However, if there are a plurality of sheets per copy, the same processing is repeated for each sheet to generate a reference image for each sheet.

In step S501, in accordance with a procedure shown in FIG. 8 (to be described later), the CPU 238 performs processing of extracting sheet vertices from the image (read image) captured by the capturing unit 240 in step S403. In this specification, the "sheet vertices" indicate four corners of a sheet. Upon completion of the extraction processing of the sheet vertices, the CPU 238 advances the process to step S502.

In step S502, in order to generate a reference image to be used for verification processing, the CPU 238 performs, using the positions of the sheet vertices obtained in step S501, processing (image deformation) of deforming the read image obtained in step S403. More specifically, based on the positions of the sheet vertices obtained in step S501 and the print setting information obtained in step S401, the CPU 238 performs processing (image deformation) of deforming the read image in conformance with the shape of the surface of the sheet used to register the reference image. Note that in this processing, processing of converting the resolution of the read image into a predetermined resolution may be performed.

Normally, the shape of an image, included in the read image, of a portion corresponding to the sheet is distorted due to skewing of the sheet or a variation in conveyance speed. For example, assume that the size of the sheet as a target of verification processing is represented by LTR and read resolutions in the main scanning direction and the sub-scanning direction are both 300 dpi. In this case, when WR represents the length in the main scanning direction and HR represents the length in the sub-scanning direction, the shape of the sheet is a rectangle of WR=11 [inches]× 300=3300 [pixels] and HR=8.5 [inches]×300=2550 [pixels]. Furthermore, if the shape of the sheet is represented by the coordinates of the four sheet vertices, the coordinates of the four sheet vertices are represented as (0, 0), (3299, 0), (0, 2549), and (3299, 2549).

In step S502, the CPU 238 deforms the read image so that the positions (coordinates) of the four sheet vertices obtained from the read image coincide with the positions (coordinates) of the four sheet vertices indicating the shape of the sheet. Such image deformation is also called geometric transformation, and can be implemented using a known method such as affine transformation. The CPU 238 saves, as a reference image, the image obtained by deforming the read image in the memory 239.

In step S503, the CPU 238 extracts feature points from the reference image obtained in step S502. The extracted feature points indicate positions in the image, which are suitable for alignment of the entire image performed when performing comparison with the reference image in the verification processing (to be described later). As the feature points suitable for alignment of the entire image, points each having a large corner feature amount in the image are considered. The corner feature is a feature such that two significant edges in different directions exist in a given local vicinity, and the corner feature amount is an amount representing the intensity of the edge feature.

If a plurality of feature points used for alignment of the entire image unevenly exit in a portion of the image, an error (positional shift) in alignment at a position separated from those feature points may be large. Since, in this way, a positional shift is large at a position separated from a given feature point, the plurality of feature points used for image alignment are desirably distributed at positions separated from each other to some extent in the image. Therefore, among points extracted from the reference image, at which the above-described corner feature amounts are large, the CPU 238 extracts, as feature points, points existing at positions distributed over the entire image. Note that an example of extraction of feature points will be described later with reference to FIGS. 10A to 10D.

Upon completion of extraction of the feature points, the CPU 238 determines whether or not a sufficient number of feature points could be extracted for image alignment, by determining in step S504 whether or not the number of feature points extracted from the reference image is equal to or larger than a predetermined number. If the number of extracted feature points is equal to or larger than the predetermined number (that is, the sufficient number of feature points could be extracted), the CPU 238 advances the process from step S504 to step S505.

On the other hand, if the number of extracted feature points is smaller than the predetermined number (that is, no sufficient number of feature points could be extracted), the CPU 238 advances the process from step S504 to step S506. A case in which the CPU 238 advances the process to step S506 is, for example, a case in which the reference image is registered using a blank sheet on which no image has been printed or a sheet on which only a pattern having only points of small corner feature amounts has been printed. It may be impossible to extract the sufficient number of feature points for image alignment from the read image obtained by reading such sheet.

In step S505, the CPU 238 saves, in the memory 239, the feature points extracted from the reference image in step S503 as setting information (alignment information) for image alignment in the verification processing, and ends the processing. On the other hand, in step S506, the CPU 238 saves, in the memory 239, the sheet vertices obtained in step S501 as setting information (alignment information) for image alignment in the verification processing, and ends the processing. Note that the CPU 238 saves, in the memory 239, the generated reference image and the alignment information in association with the print setting information obtained in step S401.

In this way, based on the number of feature points extracted from the reference image, the CPU 238 determines whether to use the positions of the feature points for image alignment or to use the positions of the sheet vertices. More specifically, if the number of feature points is equal to larger than the predetermined number, the CPU 238 determines to use the positions of the feature points for image alignment; otherwise, the CPU 238 determines to use the positions of the sheet vertices for image alignment. This determination result is saved as the alignment information in the memory 239. In image alignment (S702 to S705) (to be described later), the CPU 238 aligns the read image with the reference image using the positions of the feature points or the positions of the sheet vertices in accordance with the determination result.

With respect to the read image obtained by reading the front surface (first surface) of a sheet by the CIS 331 and the read image obtained by reading the back surface (second surface) of the sheet by the CIS 332, if the number of feature points (extracted from a reference image corresponding to each surface) is equal to or larger than the predetermined number, the positions of the feature points are used for image alignment; otherwise, the positions of the sheet vertices are used for image alignment. Note that with respect to the read image of the back surface obtained by reading by the CIS 332, the positions of the sheet vertices may be used for image alignment for any read image regardless of the number of feature points (extracted from a reference image corresponding to the back surface).

<Extraction Processing (S501, S701) of Sheet Vertices>

Figure 7:
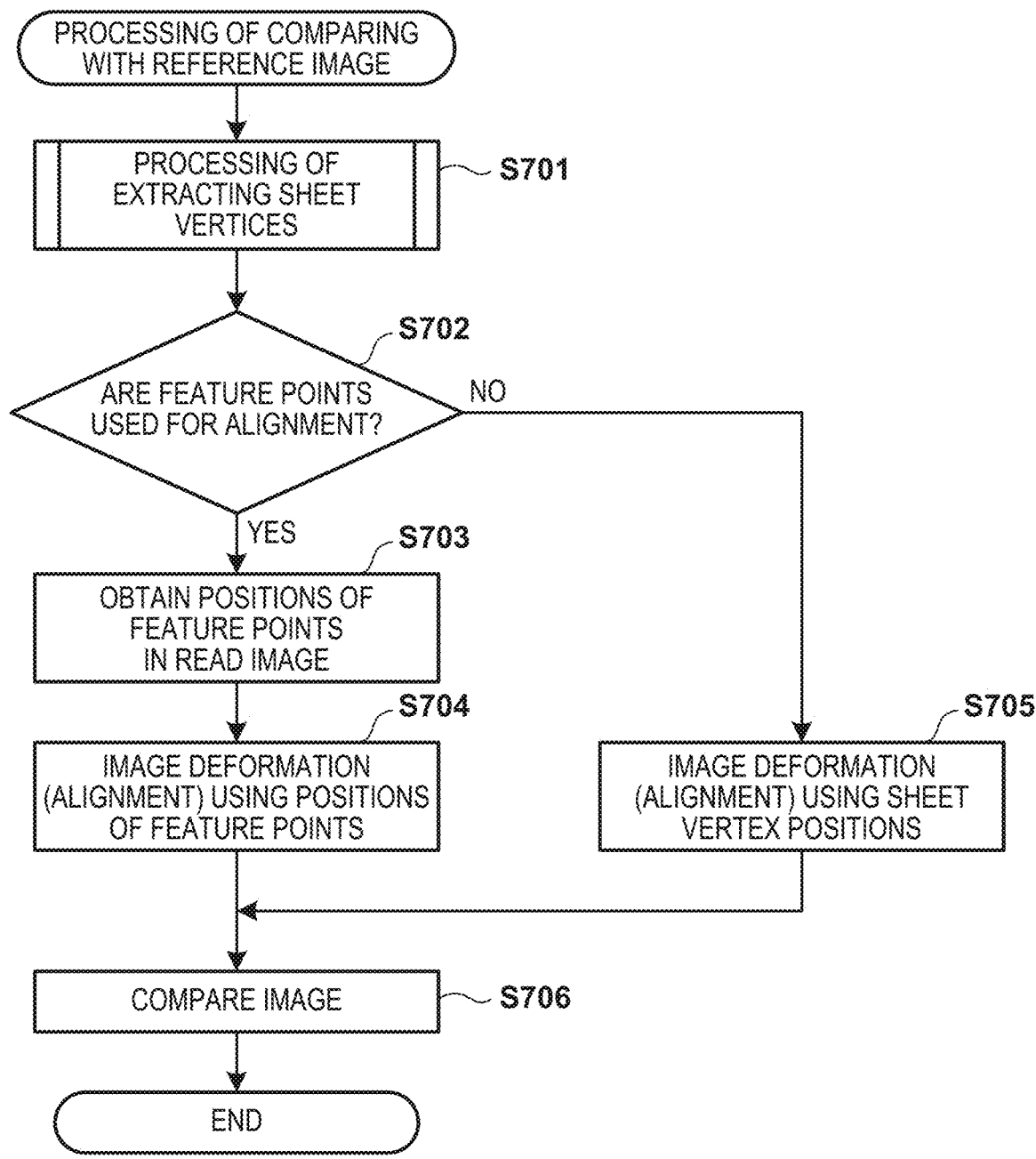
FIG. 7 is a flowchart illustrating the procedure of comparison processing (S605) with a reference image.
Figure 8:
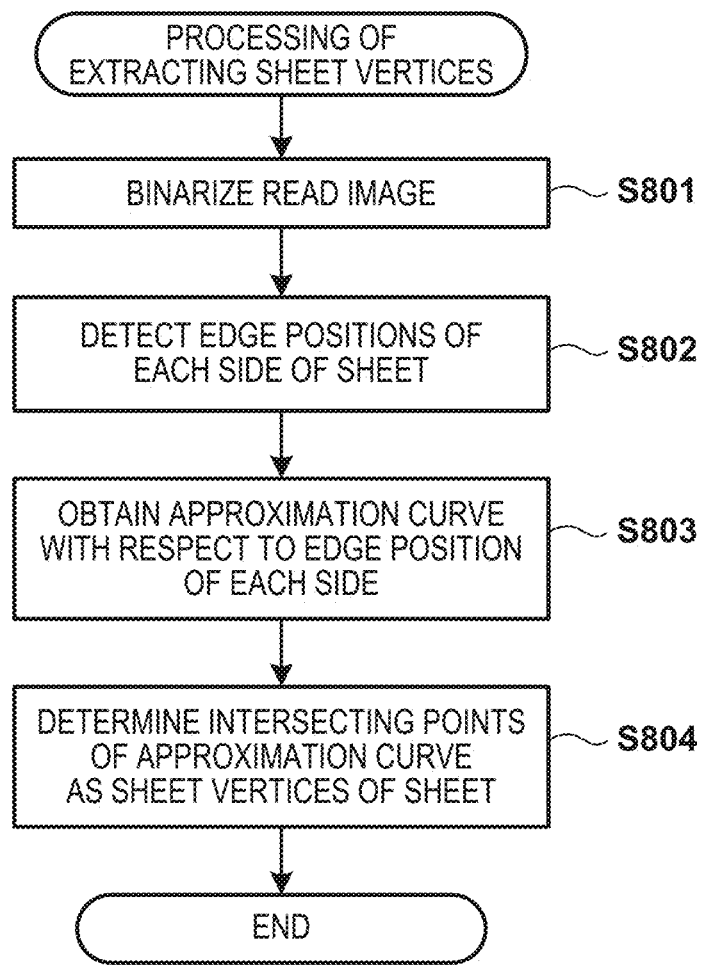
FIG. 8 is a flowchart illustrating the procedure of extraction processing (S501, S701) of sheet vertices.

FIG. 8 is a flowchart illustrating the procedure of processing of extracting the sheet vertices from the read image, which is executed in the generation processing (FIG. 5: S501) of the reference image and the comparison processing (FIG. 7: S701) (to be described later) with the reference image. FIGS. 9A to 9E are views showing an example of the processing of extracting the sheet vertices. In the present embodiment, as the image (read image) captured by the capturing unit 240, an example of an image in which the background as a portion other than the sheet is dark and the portion of the sheet is bright is used.

In step S801, the CPU 238 binarizes, using an arbitrary threshold, the read image obtained by the capturing unit 240. FIG. 9A shows an image binarized in step S801, in which x and y respectively represent the main scanning direction and the sub-scanning direction.

In step S802, the CPU 238 detects the positions of the edges of the sheet from the image binarized in step S801. In the present embodiment, since the sheet is rectangular, the edges of the sheet correspond to the four sides (upper side, lower side, left side, and right side) of the rectangle. FIG. 9B shows a portion around the upper side of the sheet in the binarized image in an enlarged scale. In order to detect the position of the edge corresponding to the upper side of the sheet, the CPU 238 scans the binarized image in the sub-scanning direction (in a direction from above to below in FIG. 9C) at predetermined intervals WE in the main scanning direction (x direction), as shown in FIG. 9C. The CPU 238 detects, as the position of the edge, a position ETn at which a pixel value changes (from a value corresponding to the background portion to a value corresponding to the sheet portion) by this scanning operation. Similarly, a position EBn of the edge corresponding to the lower side of the sheet, a position ELn of the edge corresponding to the left side, and a position ERn of the edge corresponding to the right side are detected.

In step S803, the CPU 238 obtains an approximate straight line with respect to the detected edge position, as shown in FIG. 9D. More specifically, with respect to the upper side of the sheet, an approximate straight line TL is obtained by applying a least square method to the plurality of positions ETn obtained in step S802. Similarly, the CPU 238 obtains approximate straight lines BL, LL, and RL with respect to the lower, left, and right sides of the sheet, respectively.

Finally, in step S804, the CPU 238 determines, as the positions of the sheet vertices of the sheet, the positions of four intersection points with respect to the four straight lines obtained in step S803, and ends the processing. FIG. 9E shows an example of the image (reference image) generated by deforming the read image in step S502 using the sheet vertices extracted from the read image by the above-described procedure in step S501.

Note that the extraction processing of the sheet vertices described in the present embodiment is merely an example. For example, it is necessary to perform the extraction processing in accordance with the read conditions (for example, an image is captured such that a background is white and bright) of the capturing unit 240, characteristics (for example, a black or transparent sheet or a sheet of a shape other than the rectangle) of a sheet used, and the like.

<Example of Extraction (S503) of Feature Points>

FIGS. 10A to 10D are views showing an example of extraction (S503) of the feature points from the generated reference image. FIG. 10A shows the read image obtained by the capturing unit 240. FIG. 10B shows the image (reference image) obtained by deforming the read image using the sheet vertices. As described above in association with step S503, points each having a large corner feature amount in the image are considered as feature points suitable for alignment of the entire image. As one of methods of detecting a corner feature amount, for example, there is known the Harris corner detection method. In the Harris corner detection method, a corner feature amount image is obtained from differential images in the main scanning direction and the sub-scanning direction. This corner feature amount image is an image representing the edge amount of a weaker one of two edges forming a corner feature. The corner feature represents the magnitude of a corner feature amount depending on whether a relatively weaker edge has a large edge amount even though both the two edges should be strong edges.

FIG. 10C shows an image obtained by applying the Harris corner detection method to the image shown in FIG. 10B. In this image, a pixel having a feature amount larger than a predetermined value is represented by white. In the image shown in FIG. 10C, a plurality of points having a relatively large corner feature amount exist in the image. In the present embodiment, for example, a predetermined number (in this example, six) of feature points existing at positions distributed over the entire image are extracted as feature points for alignment in descending order of the corner feature amount. Referring to FIG. 10C, the thus extracted six feature points are indicated by white dotted circles.

FIG. 10D shows, in an enlarged scale, an image of 33 neighboring pixels centering the position of one of the predetermined number (in this example, six) of feature points extracted as shown in FIG. 10C. In the verification processing (to be described later), the read image as the processing target is searched for a portion matching the image shown in FIG. 10D in the vicinity of a position corresponding to the feature point, thereby obtaining the position (coordinates) of the feature point included in the read image as the processing target.

<Verification Processing of Print Sheet>

Processing executed by the verification apparatus 109 when performing the verification processing of the print sheet will be described next with reference to FIGS. 6, 7, 11A to 11F, and 12.

Figure 6:
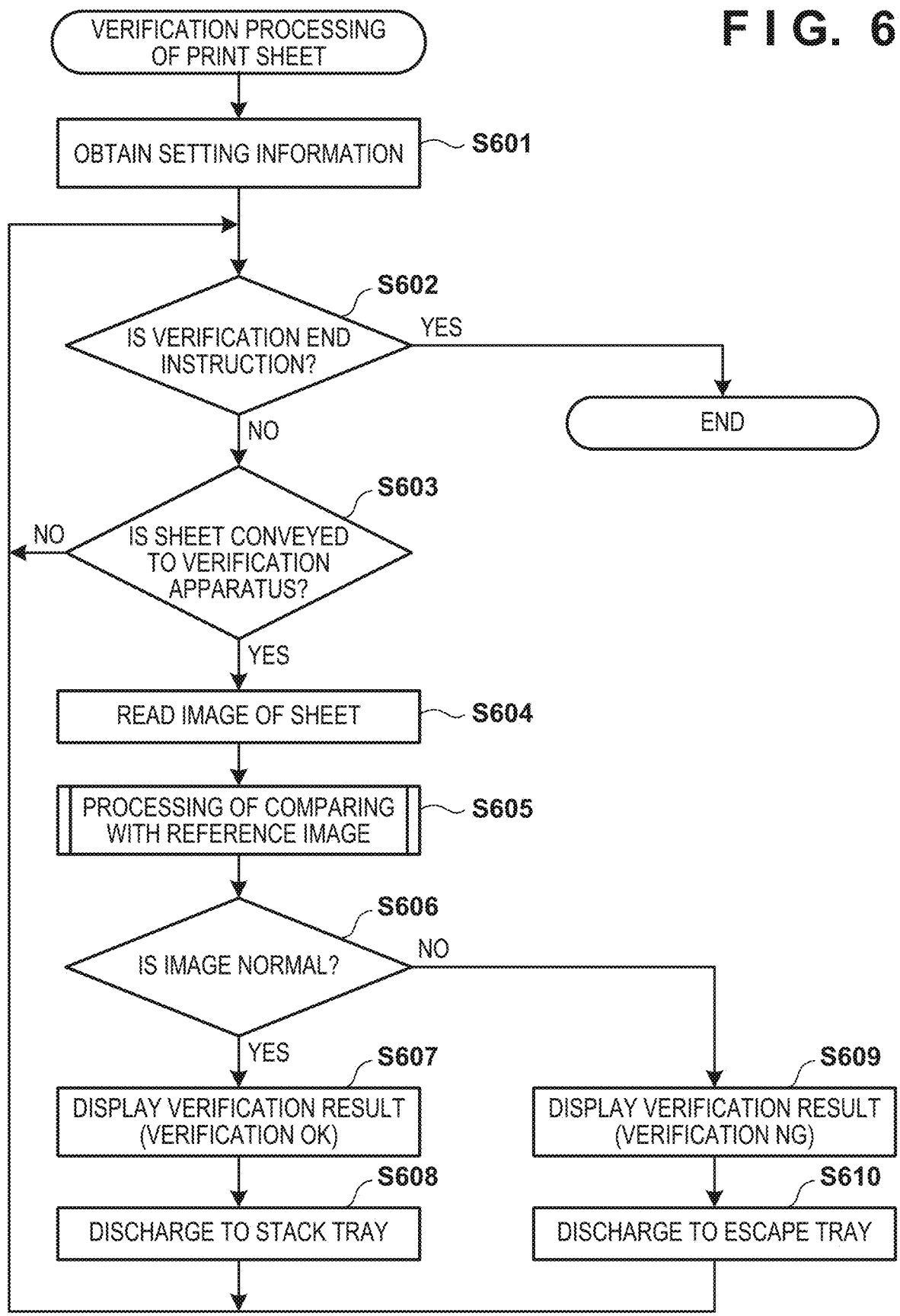
FIG. 6 is a flowchart illustrating the procedure of verification processing of a print sheet.

FIG. 6 is a flowchart illustrating the procedure of the verification processing of a print sheet, which is executed by the verification apparatus 109. Processing in each step of FIG. 6 is executed by the CPU 238 of the verification apparatus 109. In this example, as a print setting, the large-volume stacker 110 is preset as the discharge destination of a print sheet (that is, the stack tray 341 of the large-volume stacker 110 is preset as a discharge destination).

In step S601, the CPU 238 obtains the setting information saved in the memory 239, and advances the process to step S602. The obtained setting information includes print setting information and alignment information. In step S602, the CPU 238 determines whether or not a verification end instruction is received. The verification end instruction is accepted from, from example, the user via the operation unit 242. In this case, this instruction is received from the operation unit 242. If the verification end instruction is received, the CPU 238 ends the verification processing according to the procedure shown in FIG. 6; otherwise, the CPU 238 advances the process to step S604.

In step S603, the CPU 238 determines whether or not a sheet is conveyed from the apparatus (print apparatus 107 and inserter 108) on the upstream side in the conveyance direction of the sheet to the verification apparatus 109. If no sheet is conveyed, the CPU 238 returns the process to step S602; otherwise, the CPU 238 advances the process to step S604. In step S604, the CPU 238 obtains a read image by reading, by the capturing unit 240, the image of the sheet which is an inspection target, saves the obtained read image in the memory 239, and advances the process to step S605.

In step S605, the CPU 238 performs processing of comparing the read image obtained in step S604 (that is, the read image obtained by reading the image printed on the sheet) with the reference image in accordance with a procedure shown in FIG. 7 (to be described later). The reference image used here is the image registered (generated) by the registration processing (FIG. 4) of the reference image, and is saved in the memory 239. Upon completion of the comparison processing of the images, the CPU 238 determines in step S606 whether, as a result of comparison with the reference image in the comparison processing, the printed image is normal or not (that is, whether or not the normal image has been printed on the sheet).

If the printed image is normal, the CPU 238 advances the process from step S606 to step S607, and displays, on the display unit 241 of the verification apparatus 109, a verification result indicating that the printed image is normal. Furthermore, the CPU 238 instructs, in step S608, the print apparatus 107 to discharge the print sheet to the stack tray 341 of the large-volume stacker 110, and returns the process to step S602. In this case, based on an instruction from the verification apparatus 109, the print apparatus 107 instructs the large-volume stacker 110 to discharge the conveyed print sheet to the stack tray 341.

On the other hand, if the printed image is not normal (the image is abnormal), the CPU 238 advances the process from step S606 to step S609, and displays, on the display unit 241 of the verification apparatus 109, a verification result indicating that the printed image is not normal. Furthermore, the CPU 238 instructs, in step S610, the print apparatus 107 to discharge the print sheet to the escape tray 346 of the large-volume stacker 110, and returns the process to step S602. In this case, based on an instruction from the verification apparatus 109, the print apparatus 107 instructs the large-volume stacker 110 to discharge the conveyed print sheet to the escape tray 346.

After returning the process to step S602, the CPU 238 continues the processes in steps S602 to S610. Upon receiving the verification end instruction, the CPU 238 ends the verification processing according to the procedure shown in FIG. 6.

<Comparison Processing (S605) of Images>

FIG. 7 is a flowchart illustrating the procedure of the comparison processing (S605) of the images, which is executed by the CPU 238 of the verification apparatus 109 in step S605.

In step S701, the CPU 238 performs processing of extracting sheet vertices from the image (read image) captured by the capturing unit 240 in step S604. The extraction processing of the sheet vertices in step S701 is executed in accordance with the above-described procedure shown in FIG. 8, as in step S501. Upon completion of the extraction processing of the sheet vertices, the CPU 238 advances the process to step S702.

In step S702, the CPU 238 determines whether or not to use the feature points for alignment between the read image and the reference image. More specifically, if the feature points are used for the alignment information associated with the reference image to be used for the read image, it is determined to use the feature points for alignment between the read image and the reference image. As described above, if the number of feature points extracted from the reference image is equal to or larger than the predetermined number (YES in step S504), the extracted feature points are saved in the memory 239 as the alignment information associated with the reference image. On the other hand, if the number of feature points extracted from the reference image is not larger than the predetermined number (NO in step S504), the sheet vertices are saved in the memory 239 as the alignment information associated with the reference image.

If the CPU 238 determines to use the feature points for alignment between the read image and the reference image, the CPU 238 advances the process from step S702 to step S703. In step S703, the CPU 238 obtains the positions of the feature points indicated by the alignment information in the read image obtained in step S604. More specifically, as described above with reference to FIG. 10D, the CPU 238 searches the read image for a portion matching an image in the vicinity of the position (coordinates) of each feature point in the reference image using, as a reference, the sheet vertices extracted from the read image in step S701. This allows the position of each feature point in the read image to be obtained.

Upon completion of the processing in step S703, the CPU 238 performs, in step S704, processing (image deformation) of deforming the read image so that the positions (coordinates) of the feature points in the read image obtained in step S703 coincide with the positions (coordinates) of the feature points in the reference image. Note that in this processing, processing of converting the resolution of the read image into a predetermined resolution may be performed. This image deformation is also called geometric transformation, and can be implemented using a known method such as affine transformation. In affine transformation, a coefficient necessary for transformation processing can be obtained from the coordinates of portions which should match between the image (in the present embodiment, the reference image) serving as a deformation reference and the image (in the present embodiment, the read image) serving as a deformation target. Such image deformation allows alignment of the read image with the reference image to be achieved.

On the other hand, if the CPU 238 determines not to use the feature points for alignment between the read image and the reference image, the CPU 238 advances the process from step S702 to step S705. In step S705, the CPU 238 performs processing (image deformation) of deforming the read image so that the positions (coordinates) of the sheet vertices extracted from the read image in step S701 coincide with the positions (coordinates) of the sheet vertices in the reference image. Note that in this processing, processing of converting the resolution of the read image into a predetermined resolution may be performed.

As described above, in step S702 to S705, the CPU 238 aligns the read image with the reference image using the positions of the feature points or the positions of the sheet vertices in accordance with the setting information (alignment information) saved in the memory 239.

Alignment of the read image with the reference image is achieved by deforming the read image in step S704 or S705. Upon completion of deformation of the read image in step S704 or S705, the CPU 238 advances the process to step S706. In step S706, the CPU 238 compares the image after the deformation in step S704 or S705 with the reference image, and ends the comparison processing according to this procedure.

Figure 11A:
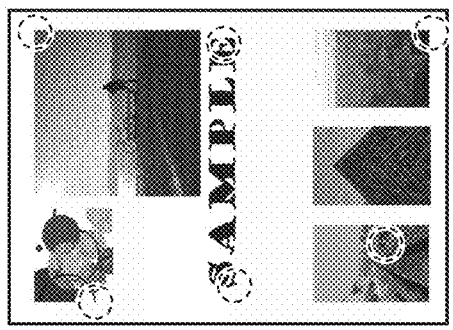
FIGS. 11A to 11F are views showing an example of image deformation.
Figure 11B:
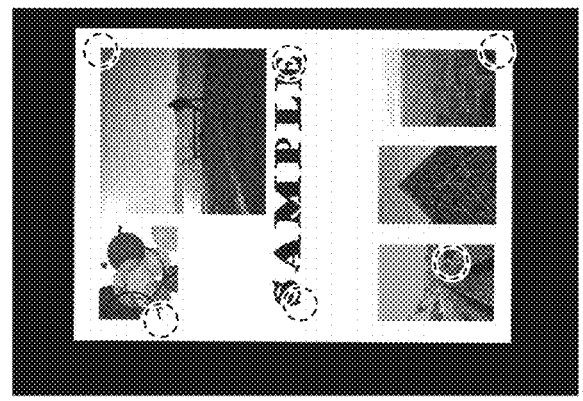
Figure 11C:
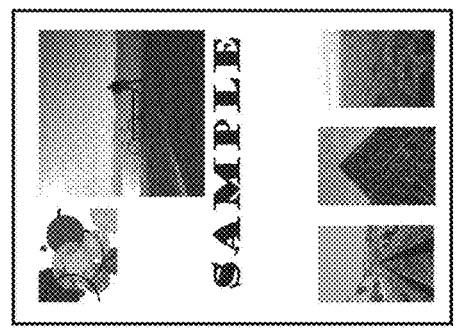

FIGS. 11A to 11F are views showing an example of the image deformation (image alignment) performed in step S704 or S705. FIGS. 11A to 11C respectively show the reference image, the read image obtained in step S604, and the image obtained by deforming the read image, in a case where the sufficient number of feature points could be extracted from the reference image for image alignment. Note that in FIGS. 11A and 11B, feature points in the reference image and the read image are indicated by dotted circles. In this example, the read image is deformed so that the positions of the feature points (indicated by the dotted circles) in the reference image shown in FIG. 11A coincide with the positions of the feature points (indicated by the dotted circles) in the read image shown in FIG. 11B. As a result, the image shown in FIG. 11C is obtained. In this case, comparison between the reference image shown in FIG. 11A and the image shown in FIG. 11C is performed in step S706, thereby inspecting the image printed on the sheet.

Figure 11D:
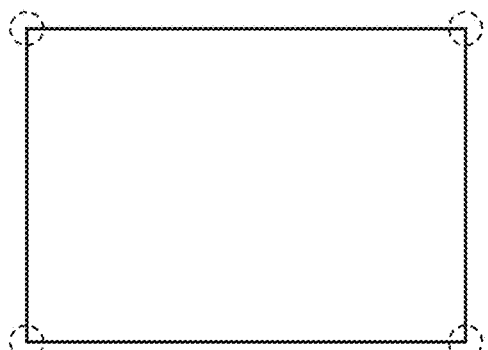
Figure 11E:
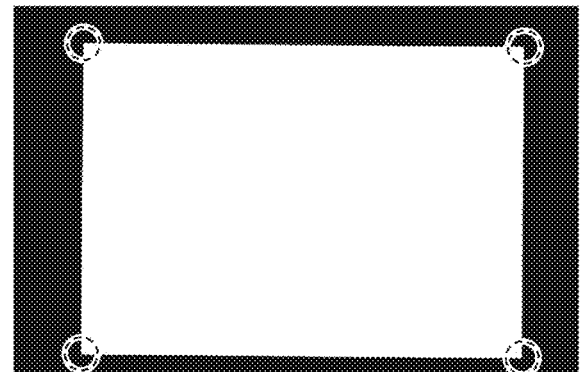
Figure 11F:

FIGS. 11D to 11F respectively show the reference image, the read image obtained in step S604, and the image obtained by deforming the read image, in a case where no sufficient number of feature points could be extracted from the reference image for image alignment. As shown in FIG. 11D, in this example, an image corresponding to a blank sheet (in a state in which no image is printed) is used as the reference image. Note that in FIGS. 11D and 11E, the sheet vertices in the reference image and the read image are indicated by dotted circles. In this example, the read image is deformed so that the positions of the sheet vertices (indicated by the dotted circles) in the reference image shown in FIG. 11D coincide with the positions of the sheet vertices (indicated by the dotted circles) in the read image shown in FIG. 11E. As a result, the image shown in FIG. 11F is obtained. In this case, comparison between the reference image shown in FIG. 11D and the image shown in FIG. 11F is performed in step S706, thereby inspecting the image printed on the sheet.

<Example of Display of Verification Result>

Figure 12:
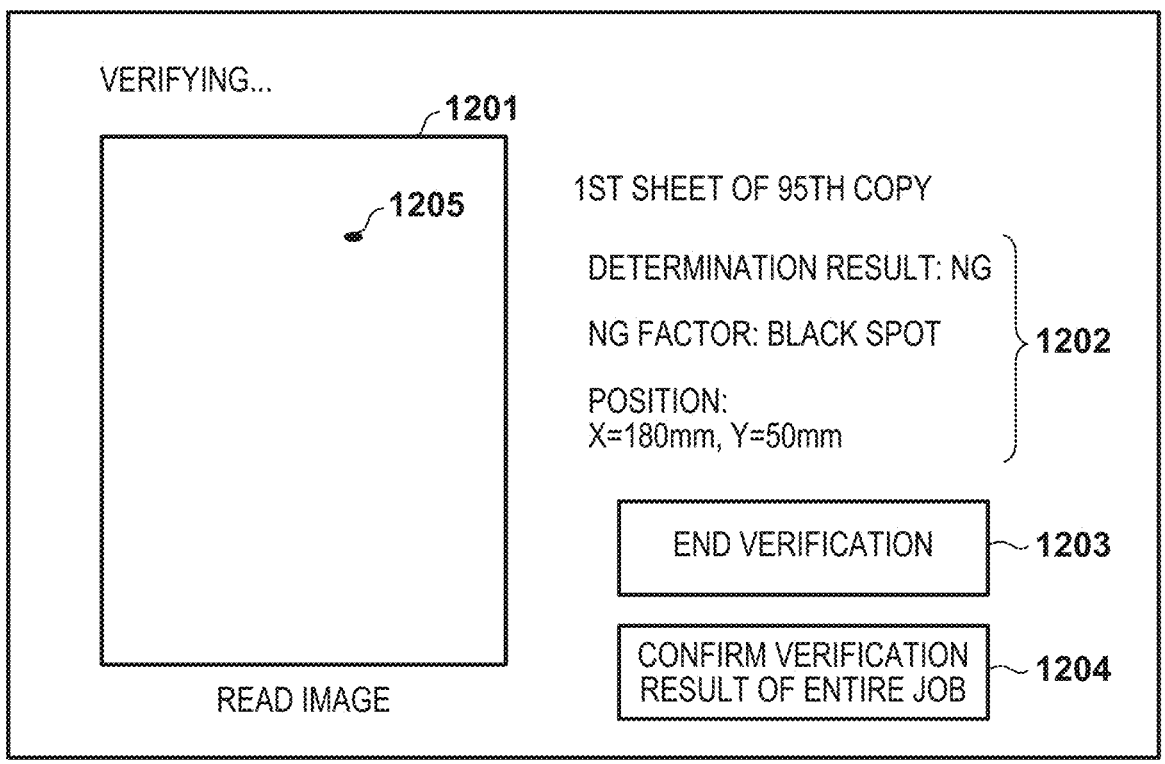
FIG. 12 is a view showing an example of an operation screen showing a verification result.

FIG. 12 is a view illustrating an example of the operation screen showing the verification result, which is displayed on the display unit 241 of the verification apparatus 109, and illustrates an example of the operation screen displayed, in step S609, when it is determined that the image printed on the sheet is abnormal. In a display region 1201, an image obtained by deforming, for alignment with the reference image, the read image finally obtained by the capturing unit 240 in the verification apparatus 109 is displayed. In a display region 1202, information (a determination result indicating that the printed image is abnormal, its factor, and a position at which the factor has occurred) indicating the verification result is displayed. A button 1203 is used to instruct to end the verification processing. Furthermore, a button 1204 is used to instruct to display a screen for the user to confirm the verification result of the entire print job. This example indicates that it is determined that the printed image is abnormal due to a black spot 1205 being detected in the image after the deformation, as a result of comparing, with the reference image (FIG. 11D), the image obtained by deforming the read image (displayed in the display region 1201).

Note that in the present embodiment, the reference image is generated (FIG. 4) by reading the image of the sheet conveyed from the print apparatus 107 to the verification apparatus 109. However, the reference image may be generated using rasterized print data. In this case, the verification apparatus 109 obtains, from the print apparatus 107, print data used to print the image of the conveyed sheet, and generates the reference image based on the obtained print data. Note that in steps S501 and S502 of the generation processing (FIG. 5) of the reference image, the verification apparatus 109 may calculate the positions of the sheet vertices of the sheet from a margin width generated when the image is printed on the sheet based on the print data.

As described above, the verification apparatus 109 according to the present embodiment obtains the reference image for inspection (verification) of a sheet, and extracts, from the reference image, feature points to be used for alignment of the image with the reference image. The verification apparatus 109 aligns, with the reference image, the read image obtained by reading the image of the sheet of an inspection (verification) target and inspects the sheet (verifying the read image) by comparing the aligned read image with the reference image. In the image alignment, the verification apparatus 109 uses, based on the number of feature points extracted from the reference image, the positions of the feature points or the positions of the sheet vertices indicating the corners of the sheet.

Thus, in the present embodiment, alignment of the read image with the reference image is performed using the positions of the feature points or the positions of the sheet vertices based on the number of feature points extracted from the obtained reference image. For example, if the number of feature points is equal to or larger than the predetermined number, image alignment is performed using the positions of the feature points; otherwise, image alignment is performed using the positions of the sheet vertices. That is, if the number of feature points extracted from the image printed on the sheet is small and no sufficient number of feature points can be used for image alignment, the image alignment is performed using the positions of the sheet vertices. This makes it possible to align the read image of the print sheet with the reference image for inspection even when inspecting the print sheet on which the image including a small number of feature points has been printed. Accordingly, it becomes possible to perform comparison (that is, the verification processing of the print sheet) between the read image and the reference image for inspection of the print sheet. For example, even if the reference image is an image corresponding to a blank sheet, it becomes possible to detect an abnormal location in the verification processing of the sheet.

Second Embodiment

The first embodiment has explained the example of deciding, based on the number of feature points in the reference image, whether to use the feature points for image alignment or to use the sheet vertices for image alignment. The second embodiment will describe an example of using both of feature points and sheet vertices for image alignment under a predetermined condition. A description of parts in common with the first embodiment will be omitted hereinafter.

<Generation Processing (S405) of Reference Image>

Figure 13:
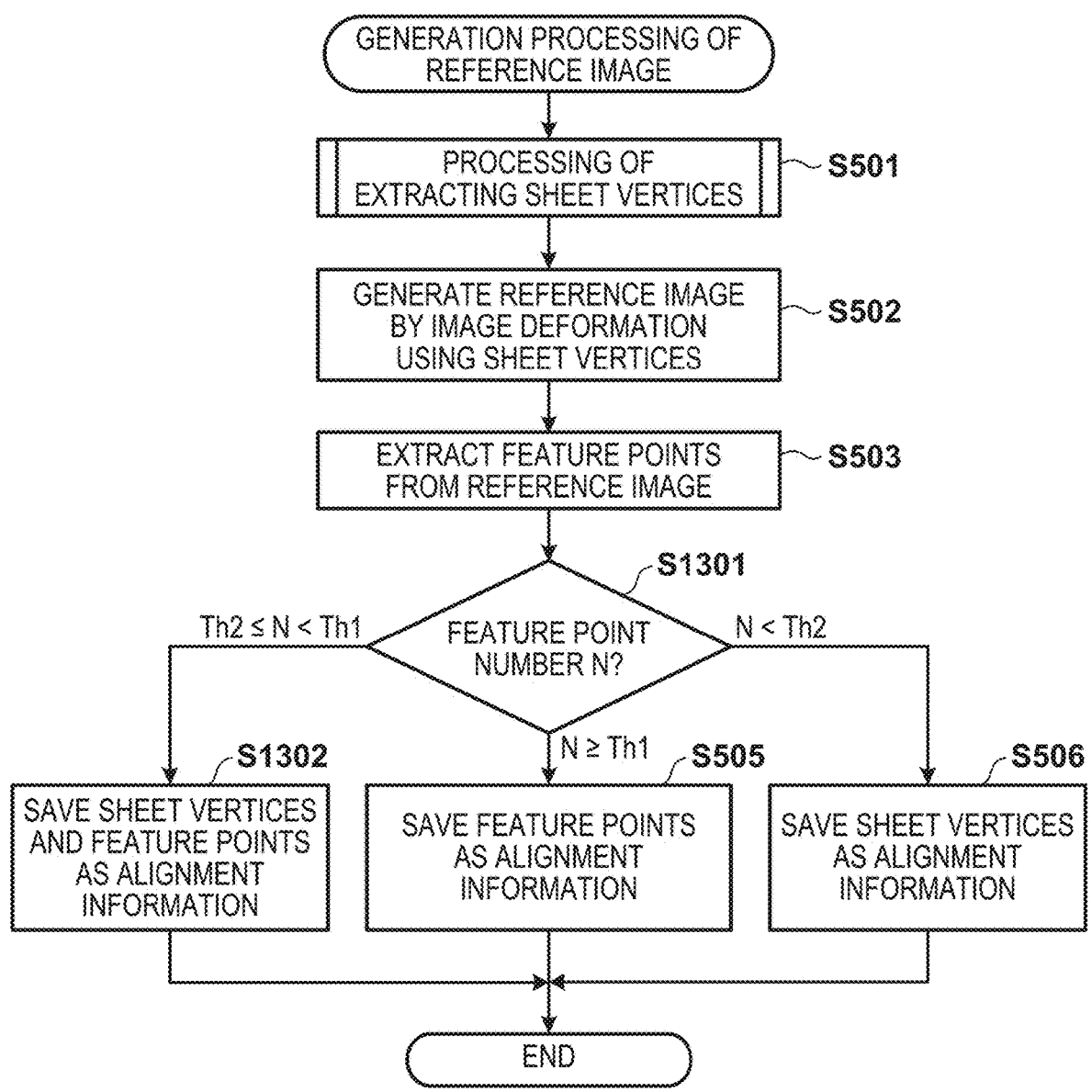
FIG. 13 is a flowchart illustrating the procedure of generation processing (S405) of a reference image according to the second embodiment.

In the present embodiment, registration processing of a reference image is executed by a verification apparatus 109 in accordance with the procedure shown in FIG. 4, similar to the first embodiment. However, in step S405, processing of generating the reference image using a read image obtained in step S403 is executed in accordance with a procedure shown in FIG. 13. FIG. 13 is a flowchart illustrating the procedure of the generation processing of the reference image according to the present embodiment. Note that processing in each of steps of FIGS. 4 and 13 is executed by a CPU 238 of the verification apparatus 109.

Steps S501 to S503 are the same as those in the first embodiment. In the present embodiment, upon completion of processing in step S503, the CPU 238 advances the process to step S1301.

In step S1301, the CPU 238 compares the number N of feature points extracted from the reference image in step S503 with a first threshold Th1 and a second threshold Th2. If, as a result of the comparison processing, the number N of extracted feature points is equal to or larger than the first threshold (Th1) (N≥Th1), the CPU 238 advances the process to step S505. This corresponds to a case in which a sufficient number of feature points could be extracted for image alignment. Alternatively, if the number N of extracted feature points is smaller than the second threshold (Th2) (N<Th2), the CPU 238 advances the process to step S506. This corresponds to a case in which no sufficient number of feature points could be extracted for image alignment. In step S505 or S506, the same processing as in the first embodiment is performed.

If, in step S1301, the number N of extracted feature points is equal to or larger than the second threshold (Th2) and is smaller than the first threshold (Th1) (Th2≤N<Th1), the CPU 238 advances the process to step S1302. This corresponds to, for example, a case in which the reference image is registered using a sheet on which a page number has been printed in a corner region of the sheet and no point having a large corner feature amount exists in a region other than that the corner region, as in one example shown in FIG. 15A.

Figure 15A:
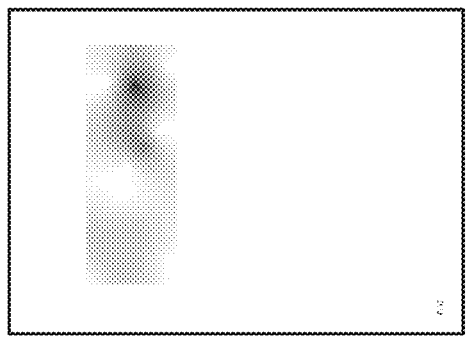
FIGS. 15A and 15B are views showing an example of extraction of feature points from the reference image according to the second embodiment.
Figure 15B:
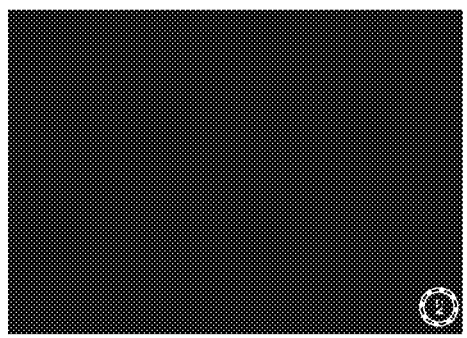

FIG. 15B shows an example of an image obtained by extracting, in step S503, feature points from the reference image shown in FIG. 15A. The image shown in FIG. 15B indicates a state in which points each having a large feature amount are localized in the corner region of the sheet (indicated by a dotted circle in FIG. 15B). If the CPU 238 extracts, in step S503, as a feature point, one of such points each having a large feature amount, the remaining points each having the large feature amount are very closely located and are thus not extracted as feature points. In this case, even if the feature point is extracted from the reference image, it may become difficult to perform alignment of the read image of a processing target with the reference image based on the feature point.

In the present embodiment, in step S1302, the CPU 238 saves, in a memory 239, the feature point extracted in step S503 and the sheet vertices existing at positions relatively far from the feature point in the image as setting information (alignment information) for image alignment in verification processing. Note that the CPU 238 saves, in the memory 239, the generated reference image and the generated alignment information in association with the print setting information obtained in step S401.

<Comparison Processing (S605) of Images>

Figure 14:
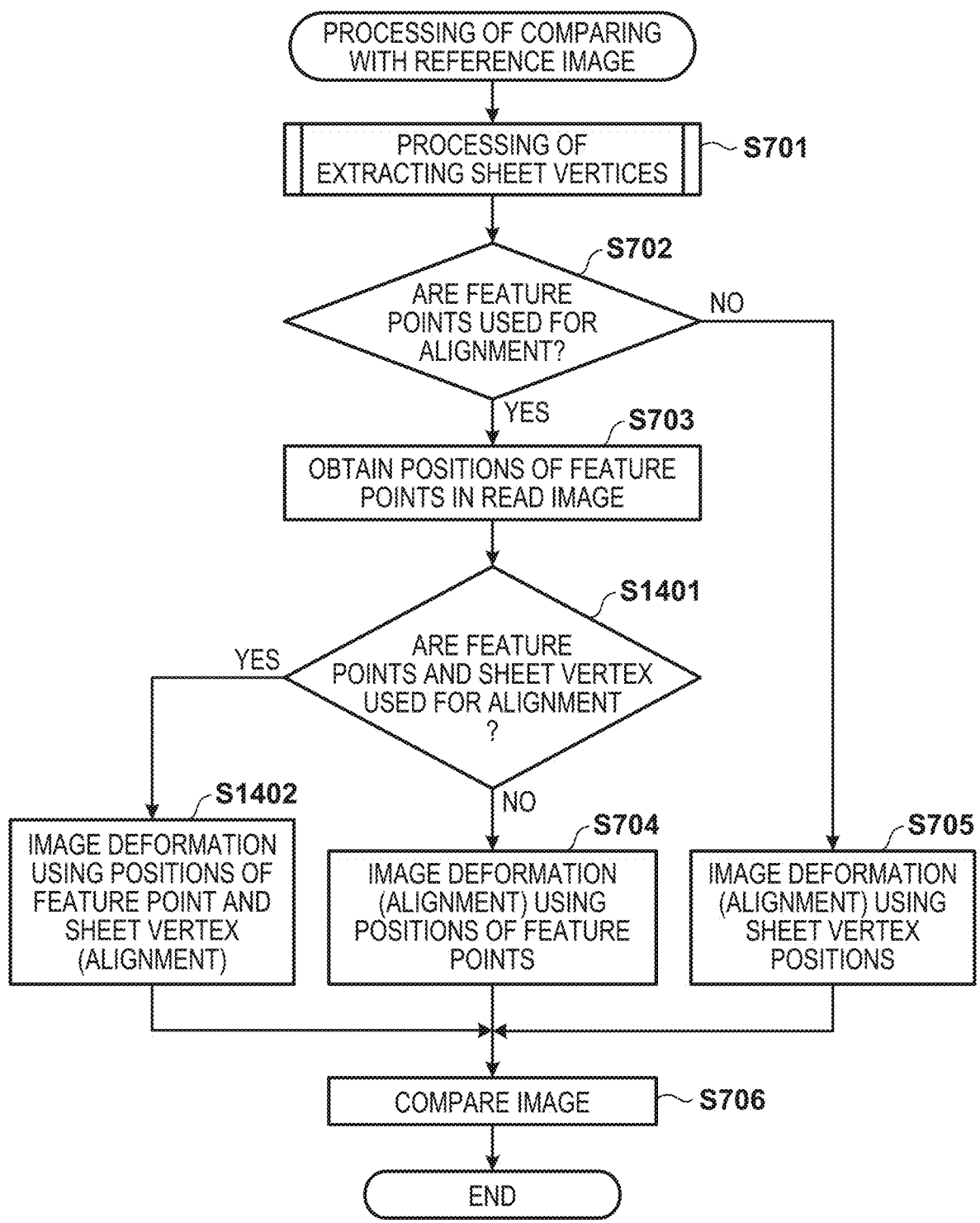
FIG. 14 is a flowchart illustrating the procedure of comparison processing (S605) with the reference image according to the second embodiment.

In the present embodiment, verification processing of a print sheet is executed by the verification apparatus 109 in accordance with the procedure shown in FIG. 6, similarly to in the first embodiment. However, in step S605, processing of comparing the read image obtained in step S604 (that is, the read image obtained by reading an image printed on the sheet) with the reference image is performed in accordance with a procedure shown in FIG. 14. FIG. 14 is a flowchart illustrating the procedure of the comparison processing of the images according to the present embodiment. Note that processing in each of steps of FIGS. 6 and 14 is executed by the CPU 238 of the verification apparatus 109.

Steps S701 to S703 and S705 are the same as those in the first embodiment. In the present embodiment, upon completion of processing in step S703, the CPU 238 advances the process to step S1401.

In step S1401, the CPU 238 determines whether or not to use both of feature points and sheet vertexes for alignment between the read image and the reference image. More specifically, if the feature points and the sheet vertexes are used in combination for the alignment information associated with the reference image used for the read image, the CPU 238 advances the process to step S1402. On the other hand, if only feature points are used for the alignment information associated with the reference image used for the read image, the CPU 238 advances the process to step S704. In step S704, the same processing as in the first embodiment is performed.

In step S1402, the CPU 238 performs processing (image deformation) of deforming the read image so that the positions (coordinates) of the feature points and the sheet vertexes in the read image, which have been obtained in step S703, coincide with the positions (coordinates) of the feature points and the sheet vertexes in the reference image. Note that in this processing, processing of converting the resolution of the read image into a predetermined resolution may be performed.

Upon completion of processing in step S704, S705, or S1402, the CPU 238 compares, in step S706, the image after the deformation in step S704, S705, or S1402 with the reference image, as in the first embodiment, and ends the comparison processing according to this procedure.

Figure 16A:
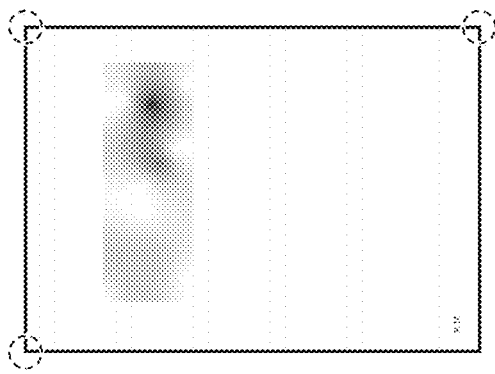
FIGS. 16A to 16C are views showing an example of image deformation according to the second embodiment.
Figure 16B:
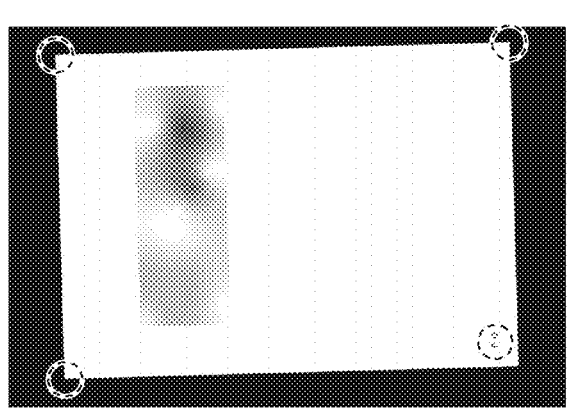

FIG. 16A shows an example of the reference image for which it is determined, in step S1401, to use both the feature point and the sheet vertex for alignment between the read image and the reference image, and the reference image is the same as that shown in FIG. 15A. FIG. 16B shows an example of the read image obtained in step S604 in the verification processing. In FIGS. 16A and 16B, a feature point and sheet vertices used for the alignment information are indicated by dotted circles.

Figure 16C:
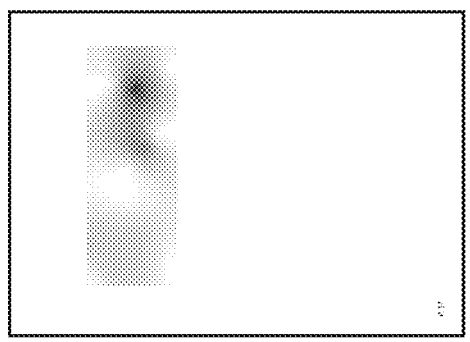

FIG. 16C shows an image having undergone the deformation (image alignment) in step S1402. In the present embodiment, the positions of the sheet vertices and the feature point shown in FIGS. 16A and 16B are used as a reference to perform alignment between the read image and the reference image. In step S706, the CPU 238 compares the image shown in FIG. 16A with that shown in FIG. 16C.

As described above, according to the present embodiment, it becomes possible to more accurately perform alignment between the reference image for inspection and the read image of the print sheet, by using both the feature point and the sheet vertex for image alignment under the predetermined condition, as needed. Accordingly, it becomes possible to more appropriately perform comparison between the read image and the reference image more appropriately for inspection of the print sheet.

Other Embodiments

In the first embodiment, various settings and instructions in the verification apparatus 109 are made using the display unit 241 and the operation unit 242 of the verification apparatus 109. The present invention, however, is not limited to this. For example, an execution instruction or end instruction of verification processing or a print instruction may be made to the verification apparatus 109 in accordance with a user operation in one of the external controller 102, the print apparatus 107, the verification apparatus 109, and the client PC 103. For example, an arrangement in which the user can make various settings and instructions to the verification apparatus 109 using the display 225 and the operation unit 224 of the print apparatus 107 may be adopted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-032194, filed Feb. 27, 2020, which is hereby incorporated by reference herein in its entirety.

What is claimed is:

1. An inspection apparatus comprising:
a generating unit configured to generate a reference image based on an image obtained by reading an image of a conveyed sheet by a reading unit;
an extraction unit configured to extract, from the reference image, feature points to be used for alignment with the reference image;
an alignment unit configured to align, with the reference image, a read image obtained by reading an image of an inspection target sheet by the reading unit; and
an inspection unit configured to inspect the read image by comparing the aligned read image with the reference image,
wherein the alignment unit performs, based on a number of the feature points extracted by the extraction unit, any of a plurality of alignments that include (1) the alignment using positions of the feature points and (2) the alignment using positions of sheet vertices indicating a corner of the inspection target sheet.

2. The apparatus according to claim 1, further comprising a determination unit configured to determine, based on the number of feature points extracted by the extraction unit, which of the plurality of alignments is to be performed,
wherein the alignment unit aligns the read image with the reference image by performing any of the plurality of alignments in accordance with a determination result of the determination unit.

3. The apparatus according to claim 2, wherein if the number of feature points is not smaller than a predetermined number, the determination unit determines to perform the alignment using the positions of the feature points, and
wherein if the number of feature points is smaller than the predetermined number, the determination unit determines to perform the alignment using the positions of the sheet vertices.

4. The apparatus according to claim 1, wherein the generating unit generates the reference image by (a) extracting the sheet vertices from the image obtained by the reading unit, and (b) deforming the image in conformance with a shape of a surface of the sheet based on the positions of the extracted sheet vertices and a print setting used for printing executed for the sheet.

5. The apparatus according to claim 4, wherein if the number of feature points extracted by the extraction unit is not smaller than a predetermined number, the apparatus saves the feature points as setting information for the alignment in association with the reference image, and
wherein if the number of feature points extracted by the extraction unit is smaller than the predetermined number, the apparatus saves the sheet vertices as the setting information in association with the reference image.

6. The apparatus according to claim 5, wherein the alignment unit aligns the read image with the reference image in accordance with the saved setting information.

7. The apparatus according to claim 6, wherein if the positions of the feature points are used for the alignment of the read image with the reference image, the alignment unit performs the alignment by (a) obtaining the positions of the feature points, in the read image, indicated by the setting information, and (b) deforming the read image so that the positions of the feature points in the read image coincide with the positions of the feature points in the reference image.

8. The apparatus according to claim 6, wherein if the positions of the sheet vertices are used for the alignment of the read image with the reference image, the alignment unit performs the alignment by deforming the read image so that the positions of the sheet vertices extracted from the read image coincide with the positions of the sheet vertices in the reference image.

9. The apparatus according to claim 1, wherein based on the number of feature points extracted by the extraction unit from the reference image, the alignment unit performs any of the plurality of alignments that include (1) the alignment using the positions of the feature points, (2) the alignment using the positions of the sheet vertices, and (3) the alignment using both of the feature points and the sheet vertices.

10. The apparatus according to claim 9, wherein if the number of feature points is not smaller than a first threshold, the alignment unit performs the alignment using the positions of the feature points,
wherein if the number of feature points is smaller than a second threshold that is smaller than the first threshold, the alignment unit performs the alignment using the positions of the sheet vertices, and
wherein if the number of feature points is not smaller than the second threshold and is smaller than the first threshold, the alignment unit performs the alignment using both of the feature points and the sheet vertices.

11. The apparatus according to claim 1, further comprising a control unit configured to perform discharge control of discharging, to different discharge destinations, a sheet determined not to be abnormal and a sheet determined to be abnormal, as a result of the inspection by the inspection unit.

12. The apparatus according to claim 1, wherein the reading unit includes (a) a first reading unit configured to read an image of a first surface of a conveyed sheet and (b) a second reading unit configured to read an image of a second surface on an opposite side of the first surface of the conveyed sheet,
wherein based on the number of feature points extracted from a reference image corresponding to the first surface, the alignment unit performs any of the plurality of alignments for the read image of the first surface obtained by the reading by the first reading unit, and
wherein the alignment unit performs the alignment using the positions of the sheet vertices for the read image of the second surface obtained by the reading by the second reading unit.

13. A print system comprising:
a print apparatus configured to print an image on a sheet; and
an inspection apparatus configured to inspect a sheet on which an image has been printed by the print apparatus and which has been conveyed through a conveyance path,
wherein the inspection apparatus comprises:
(A) a generating unit configured to generate a reference image based on an image obtained by reading an image of a conveyed sheet by a reading unit;
(B) an extraction unit configured to extract, from the reference image, feature points to be used for alignment with the reference image;
(C) an alignment unit configured to align, with the reference image, a read image obtained by reading an image of an inspection target sheet by the reading unit; and
(D) an inspection unit configured to inspect the read image by comparing the aligned read image with the reference image, and
wherein the alignment unit performs, based on a number of the feature points extracted by the extraction unit, any of a plurality of alignments that include (1) the alignment using positions of the feature points and (2) the alignment using positions of sheet vertices indicating a corner of the inspection target sheet.

14. A method for controlling an inspection apparatus, the method comprising:
generating a reference image based on an image obtained by reading an image of a conveyed sheet by a reading unit;
extracting, from the reference image, feature points to be used for alignment with the reference image;
aligning, with the reference image, a read image obtained by reading an image of an inspection target sheet by the reading unit; and
expecting the read image by comparing the aligned read image with the reference image,
wherein in the aligning, based on a number of the feature points extracted from the reference image, there is performed any of a plurality of alignments that include (1) the alignment using positions of the feature points and (2) the alignment using positions of sheet vertices indicating a corner of the inspection target sheet.

15. A non-transitory computer-readable storage medium storing a computer program for causing a computer to execute a method for controlling an inspection apparatus, the method comprising:
generating a reference image based on an image obtained by reading an image of a conveyed sheet by a reading unit;
extracting, from the reference image, feature points to be used for alignment with the reference image;
aligning, with the reference image, a read image obtained by reading an image of an inspection target sheet by the reading unit; and
inspecting the read image by comparing the aligned read image with the reference image,
wherein in the aligning, based on a number of the feature points extracted from the reference image, there is performed any of a plurality of alignments that include (1) the alignment using positions of the feature points and (2) the alignment using positions of sheet vertices indicating a corner of the inspection target sheet.

* * * * *